US011431466B2

(12) United States Patent
Huang et al.

(10) Patent No.: US 11,431,466 B2
(45) Date of Patent: Aug. 30, 2022

(54) COMMUNICATION METHOD AND APPARATUS

(71) Applicant: Huawei Technologies Co., Ltd., Shenzhen (CN)

(72) Inventors: Huang Huang, Shenzhen (CN); Kuandong Gao, Chengdu (CN); Mao Yan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 122 days.

(21) Appl. No.: 16/696,219

(22) Filed: Nov. 26, 2019

(65) Prior Publication Data
US 2020/0099500 A1 Mar. 26, 2020

Related U.S. Application Data

(63) Continuation of application No. PCT/CN2018/088769, filed on May 28, 2018.

(30) Foreign Application Priority Data

Jun. 2, 2017 (CN) .......................... 201710409898.1

(51) Int. Cl.
*H04L 5/10* (2006.01)
*H04L 5/00* (2006.01)
(Continued)

(52) U.S. Cl.
CPC .............. *H04L 5/10* (2013.01); *H04L 5/0051* (2013.01); *H04W 56/001* (2013.01);
(Continued)

(58) Field of Classification Search
CPC ...... H04L 5/10; H04L 5/0051; H04W 56/001; H04W 68/005; H04W 72/005; H04W 72/0446
See application file for complete search history.

(56) References Cited

U.S. PATENT DOCUMENTS 10,056,955 B2 8/2018 Liu et al.
2009/0238064 A1* 9/2009 Lee ..................... H04L 25/0226
370/208
(Continued)

FOREIGN PATENT DOCUMENTS

CN 105553632 A 5/2016
CN 105900387 A 8/2016
(Continued)

OTHER PUBLICATIONS

"NR-PBCH Design," Agenda Item: 7.1.1.2.1, Source: LG Electronics, Document for: Discussion and decision, 3GPP TSG RAN WG1 Meeting #89, R1-1707590, May 15-19, 2017, 14 pages.
(Continued)

*Primary Examiner* — Jeffrey M Rutkowski
*Assistant Examiner* — Chae S Lee
(74) *Attorney, Agent, or Firm* — Slater Matsil, LLP

(57) ABSTRACT

A communication method and an apparatus, the method including generating a demodulation reference signal (DMRS) sequence of a broadcast signal according to a pseudo-random sequence c(m), where the DMRS sequence is related to a quantity $N_{RB}$ of resource blocks (RBs) of the broadcast signal and a quantity $n_{RE}$ of resource elements (REs) occupied by the DMRS sequence in one RB, and mapping the DMRS sequence to one or more symbols.

20 Claims, 7 Drawing Sheets

(51) Int. Cl.
  *H04W 56/00* (2009.01)
  *H04W 68/00* (2009.01)
  *H04W 72/00* (2009.01)
  *H04W 72/04* (2009.01)

(52) U.S. Cl.
  CPC ....... *H04W 68/005* (2013.01); *H04W 72/005* (2013.01); *H04W 72/0446* (2013.01)

(56) References Cited

U.S. PATENT DOCUMENTS

| | | | |
|---|---|---|---|
| 2011/0244877 | A1 | 10/2011 | Farajidana et al. |
| 2012/0020323 | A1* | 1/2012 | Noh ................. H04L 5/0048 370/330 |
| 2015/0288497 | A1 | 10/2015 | Li et al. |
| 2017/0078006 | A1 | 3/2017 | Liu et al. |
| 2017/0288743 | A1 | 10/2017 | Nam et al. |
| 2018/0262308 | A1* | 9/2018 | Si ..................... H04L 27/2613 |
| 2019/0306820 | A1* | 10/2019 | Jiang ................ H04W 56/00 |

FOREIGN PATENT DOCUMENTS

| | | | |
|---|---|---|---|
| CN | 106134140 A | 11/2016 | |
| EP | 3120514 B1 | 1/2019 | |
| EP | 3433970 A1 | 1/2019 | |
| KR | 20180122607 A | 11/2018 | |
| KR | E3413495 A1 * | 12/2018 | ............... H04L 5/00 |
| WO | 2012148207 A2 | 11/2012 | |
| WO | 2015188355 A1 | 12/2015 | |

OTHER PUBLICATIONS

"Discussion on Remaining Minimum System Information Delivery," Agenda Item: 7.1.1.2.2, Source: MediaTek Inc., Document for: Discussion/Decision, 3GPP TSG RAN WG1 Meeting #89, R1-1707817, May 15-19, 2017, 3 pages.

"3rd Generation Partnership Project; Technical Specification Group Radio Access Network; Evolved Universal Terrestrial Radio Access (E-UTRA); Physical channels and modulation (Release 14)," 3GPP TS 36.211 V14.0.0, Sep. 2016, 170 pages.

"Draft Report of 3GPP TSG RAN WG1 #89 v0.1.0," Source: MCC Support, Document for: Comments, 3GPP TSG RAN WG1 Meeting #90, R1-171xxxx, Aug. 21-25, 2017, 162 pages.

"3rd Generation Partnership Project; Technical Specification Group Radio Access Network; NR; Physical channels and modulation (Release 15)," 3GPP TS 38.211 V0.0.0, May 2017, 10 pages.

"Discussion and Evaluation on NR-SS Multiplexing and Bandwidth," Agenda Item: 5.1.1.1.1, Source: Huawei, HiSilicon, Document for: Discussion and decision, 3GPP TSG RAN WG1 NR Ad Hoc Meeting, R1-1700033, Jan. 16-20, 2017, 12 pages.

"SS BW and Multiplexing," Agenda item: 5.1.1.1.1, Source: Samsung, Document for: Discussion, 3GPP TSG RAN WG1 NR AH, R1-1700884, Jan. 16-20, 2017, 8 pages.

"SS Bandwidth, Numerology and Multiplexing," Agenda item: 5.1.1.1.1, Source: Nokia, Alcatel-Lucent Shanghai Bell, Document for: Discussion and Decision, 3GPP TSG-RAN WG1 NR AH Meeting, R1-1701056, Jan. 16-20, 2017, 8 pages.

"SS Burst Set Composition and SS Time Index Indication," Agenda Item: 8.1.1.1.2, Source: Ericsson, Document for Discussion, Decision, 3GPP TSG-RAN WG1 Meeting #88, R1-1702120, Feb. 13-17, 2017, 4 pages.

"SS Burst Composition and Time Index Indication Considerations," Agenda item: 8.1.1.1.2, Source: Qualcomm Incorporated, Document for: Discussion/Decision, 3GPP TSG-RAN WG1 Nr #88, R1-1702585, Feb. 13-17, 2017, 6 pages.

"SS Burst Set Composition and Time Index Indication," Agenda item: 8.1.1.1.2, Source: Samsung, Document for: Discussion and decision, 3GPP TSG RAN WG1 #88, R1-1702901, Feb. 13-17, 2017, 5 pages.

"Discussion on SS Burst Set Composition and SS Block Time Index Indication," Agenda Item: 8.1.1.1.2, Source Huawei, HiSilicon, Document for: Discussion and decision, 3GPP TSG RAN WG1 Meeting #88, R1-1703353, Feb. 13-17, 2017, 7 pages.

"Composition of SS Block, Burst and Burst Set," Source: ZTE, ZTE Microelectronics, Agenda Item: 8.1.1.1.2, Document for: Discussion and Decision, 3GPP TSG RAN WG1 Meeting #88bis, R1-1704358, Apr. 3-7, 2017, 10 pages.

"SS Block Composition," Source: Intel Corporation, Agenda item: 8.1.1.1.2, Document for: Discussion and Decision, 3GPP TSG RAN WG1 Meeting RAN1 #88bis, R1-1704708, Apr. 3-7, 2017, 4 pages.

"Discussion on SS Block, SS Burst Set Composition and Time Index Indication," Agenda Item: 8.1.1.1.2, Source: LG Electronics, Document for: Discussion and decision, 3GPP TSG RAN WG1 Meeting #88bis, R1-1704862, Apr. 3-7, 2017, 8 pages.

"Discussion on SS Burst Set Composition andSS Block Time Index Indication," Agenda Item: 8.1.1.1.2, Source Huawei, HiSilicon, Document for: Discussion and decision, 3GPP TSG RAN WG1 Meeting #88bis, R1-1705052, Apr. 3-7, 2017, 9 pages.

"SS Block Composition, SS Burst Set Composition and SS Time Index," Agenda item: 8.1.1.1.2, Source: Samsung, Document for: Discussion, 3GPP TSG RAN WG1 #88bis, R1-1705318, Apr. 3-7, 2017, 12 pages.

"SS Block, Burst-Set Composition, and Time Index Indication," Agenda item: 8.1.1.1.2, Source: Qualcomm Incorporated, Document for: Discussion/Decision, 3GPP TSG-RAN WG1 NR #88bis, R1-1705565, Apr. 3-7, 2017, 9 pages.

"Discussion on SS Block Composition, SS Burst Set Composition and SS Block Index Indication For NR," Source: NTT Docomo, Inc., Agenda Item: 8.1.1.1.2, Document for: Discussion and Decision, 3GPP TSG RAN WG1 Meeting #88bis, R1-1705705, Apr. 3-7, 2017, 8 pages.

"SS Block Composition, SS Burst Set Composition and SS Time Index Indication," Agenda item: 8.1.1.1.2, Source Nokia, Alcatel-Lucent Shanghai Bell, Document for: Discussion and Decision, 3GPP TSG-RAN WG1 Meeting #88bis, R1-1705837, Apr. 3-7, 2017, 13 pages.

"SS Burst Set Composition," Agenda Item: 8.1.1.1.2, Source: Ericsson, Document for: Discussion, Decision, 3GPP TSG-RAN WG1 Meeting #88bis, R1-1706008, Apr. 3-7, 2017, 6 pages.

"On SS Block Time Index Indication," Source: ZTE, Agenda Item: 7.1.1.1.3, Document for: Discussion and Decision, 3GPP TSG RAN WG1 Meeting #89, R1-1707044, May 15-19, 2017, 6 pages.

"DMRS Design for NR-PBCH," Source: vivo, Agenda Item: 7.1.1.2.1, Document for: Discussion and Decision, 3GPP TSG RAN WG1 Meeting #89, R1-1707228, May 15-19, 2017, 16 pages.

"Discussion on SS Block Time Index Indication," Agenda Item: 7.1.1.1.3, Source: LG Electronics, Document for Discussion and decision, 3GPP TSG RAN WG1 Meeting #89, R1-1707589, May 15-19, 2017, 3 pages.

"Discussion on SS Block Time Index Indication," Agenda item: 7.1.1.1.3, Source: Samsung, Document for: Discussion and Decision, 3GPP TSG RAN WG1 #89, R1-1707928, May 15-19, 2017, 5 pages.

"Discussion on SS Block Time Index Indication," Agenda Item: 7.1.1.1.3, Source: Huawei, HiSilicon, Document for Discussion and decision, 3GPP TSG RAN WG1 Meeting #89, R1-1708166, May 15-19, 2017, 5 pages.

"SS Block Time Index Indication," Agenda item: 7.1.1.1.3, Source: Nokia, Alcatel-Lucent Shanghai Bell, Document for Discussion and Decision, 3GPP TSG-RAN WG1 Meeting #89, R1-1708233, May 15-19, 2017, 9 pages.

"NR-PBCH Design," Agenda item: 7.1.1.2.1, Source: Nokia, Alcatel-Lucent Shanghai Bell, Document for: Discussion and Decision, 3GPP TSG RAN WG1 Meeting #89, R1-1708234, May 15-19, 2017, 5 pages.

"Discussion on SS Block Time Index Indication," Source: NTT Docomo, Inc., Agenda Item: 7.1.1.1.3, Document for: Discussion and Decision, 3GPP TSG RAN WG1 Meeting #89, R1-1708438, May 15-19, 2017, 4 pages.

"SSB Time Index Indication," Agenda Item: 7.1.1.1.3, Source: Ericsson, Document for: Decision, Discussion, 3GPP TSG-RAN WG1 Meeting #89, R1-1708721, May 15-19, 2017, 3 pages.

(56) References Cited

OTHER PUBLICATIONS

"WF on SS Block Index Indication," Agenda item: 7.1.1.1.3, 3GPP TSG RAN WG1 Meeting RAN1#89, R1-1709490, May 15-19, 2017, 4 pages.

LG Electronics, Intel; "WF on DMRS Sequence for NR-PBCH", 3GPP TSG RAN WG1 Meeting #89, R1-1709817, May 15-19, 2017, 2 pages, Hangzhou, P.R. China.

Ericsson, "Remaining details on paging design", 3GPP TSG RAN WG1 Meeting #91 , R1-1720939, Dec. 1-27, 2017, 10 pages, Reno, Nevada, US.

* cited by examiner

COMMUNICATION METHOD AND APPARATUS

CROSS-REFERENCE TO RELATED APPLICATIONS

This application is a continuation of International Application No. PCT/CN2018/088769, filed on May 28, 2018 which claims priority to Chinese Patent Application No. 201710409898.1, filed on Jun. 2, 2017. The disclosures of the aforementioned applications are hereby incorporated by reference in their entireties.

TECHNICAL FIELD

This application relates to the field of communications technologies, and in particular, to a communication method and an apparatus.

BACKGROUND

With rapid development of communications technologies, people impose a higher requirement for a data rate and efficiency of wireless communication. In a new radio (NR) communications system, energy of a transmitted signal can be limited in a beam direction by using a beamforming technology, thereby improving signal transmission and receiving efficiency. A transmission range of a radio signal can be effectively expanded by using the beamforming technology, to reduce signal interference, thereby achieving higher communication efficiency and obtaining a higher network capacity. However, if the beamforming technology is used, beam scanning needs to be performed on transmission of a broadcast signal, and channels of different beam signals are inconsistent after beam scanning. As a result, each broadcast signal channel needs to carry a demodulation reference signal (DMRS) for demodulation.

Currently, in a long term evolution (LTE) system, because a period of a broadcast signal is consistent with a period of a cell-specific reference signal (CRS), the CRS is usually used as a DMRS of a broadcast signal channel for signal demodulation. However, in the NR system, a period of a CRS may be inconsistent with a period of a broadcast signal. Therefore, when a method of using a CRS as a DMRS of a broadcast signal channel in the LTE system is used, some broadcast signal channels do not have DMRSs. Consequently, demodulation cannot be performed on these broadcast signal channels, or a terminal device cannot access a base station.

SUMMARY

Embodiments of this application provide a communication method and an apparatus, and in particular, provide a new DMRS of a broadcast signal channel, which may be applied to NR.

To achieve the foregoing objectives, the following technical solutions are used in the embodiments of this application.

According to a first aspect, a demodulation reference signal sequence generation method is provided. The method includes generating a demodulation reference signal DMRS sequence of a broadcast signal based on a pseudo-random sequence c(m), where the DMRS sequence is related to a quantity $N_{RB}$ of resource blocks (RBs) of the broadcast signal and a quantity $n_{RE}$ of resource elements REs occupied by the DMRS sequence in one RB, and mapping the DMRS sequence to one or more symbols. In the foregoing technical solution, the DMRS sequence of the broadcast signal is generated based on the pseudo-random sequence c(m), and the DMRS sequence is mapped to the one or more symbols, so that a dedicated DMRS sequence is generated for the broadcast signal. The DMRS sequence is sent to a terminal device, so that the terminal device can correctly demodulate the broadcast signal and quickly access a base station.

In a possible implementation of the first aspect, the broadcast signal is paging information, a physical broadcast channel (PBCH), or system information.

In a possible implementation of the first aspect, the generating a demodulation reference signal (DMRS) sequence of a broadcast signal based on a pseudo-random sequence c(m) includes generating the DMRS sequence of the broadcast signal based on the pseudo-random sequence c(m) according to a formula (1), where in the formula, 1 represents an index value of a symbol in one slot, $r_l(m)$ represents the DMRS sequence, and m represents a sequence index value of the DMRS sequence.

$$r_l(m) = \frac{1}{\sqrt{2}}(1 - 2 \cdot c(2m)) + j\frac{1}{\sqrt{2}}(1 - 2 \cdot c(2m+1)), \quad (1)$$

$$m = 0, 1, \ldots, n_{RE}N_{RB} - 1.$$

In a possible implementation of the first aspect, a value of $n_{RE}$ is 3 or 4.

In a possible implementation of the first aspect, when the broadcast signal is paging information or system information, an initial value $c_{init}$ of the pseudo-random sequence c(m) is either one of initial values shown in the following formulas (1-1a) and (1-1b), and the initial value $c_{init}$ is used to generate the pseudo-random sequence c(m).

$$c_{init} = 2^{k_1} \cdot (n_{SS}+1) + 2^{k_2} \cdot N_{ID} + n_{RNTI} \quad \text{(1-1a); and}$$

$$c_{init} = 2^{10}(m_2(n_{SS}+1) = l_2+1) \cdot (2 \cdot N_{ID}^{cell}+1) + 2 \cdot N_{ID} + n_{RNTI} \quad \text{(1-1b), where}$$

in the formulas, $N_{ID}$ represents a physical cell identifier $N_{ID}^{cell}$ of a cell or an identifier $N_{ID}^{SFN}$ of an area including a plurality of cells, a value of $k_1$ and a value of $k_2$ are constants from 0 to 64, $n_{RNTI}$ represents a value of a radio network temporary identifier, $n_{SS}$ represents an index value of a synchronization signal block in a synchronization signal burst set, $m_2$ represents a quantity of symbols in an RB of the paging information or the system information, and $l_2$ represents an index value of a symbol in the RB of the paging information or the system information.

In a possible implementation of the first aspect, the mapping the DMRS sequence to one or more symbols specifically includes mapping the DMRS sequence to a resource element (RE) included in the resource block (RB) of the broadcast signal, according to a formula (2).

$$a_{k,l} = r_{l,n}(m) \quad (2), \text{ where}$$

in the formula, $a_{k,l}$ represents a location of an RE that is in the RB and that is occupied by a sequence code included in the DMRS sequence, k represents an index value of a frequency in a symbol, l represents an index value of a symbol in one slot or an index value of a symbol in the RB of the broadcast signal, n represents an index value of a resource scheduling unit of the broadcast signal, and m represents a sequence index value of the DMRS sequence.

In another possible implementation of the first aspect, a value of k, a value of l, and a value of m are specifically obtained according to a formula (2-1a).

$$k = n_{density} \cdot m + v_{shift} + v$$

$$l = \{l_1\} \text{ or } \{l_1, l_2\}$$

$$m = 0, 1, \ldots, N_{RE} N_{RB} - 1$$

$$v_{shift} = N_{ID}^{cell} \mod n_{density} \quad (2\text{-}1a), \text{ where}$$

in the formula, $n_{density}$ represents density for transmitting the DMRS sequence in the RB, $v_{shift}$ represents a value of a first frequency offset of a start RE location of the DMRS sequence relative to an RE having a lowest frequency, v represents a value of a second frequency offset of a start RE location of the DMRS sequence relative to an RE having a lowest frequency, a value range of $l_1$ and a value range of $l_2$ are 0, 1, 2, ..., and $N_{symbol}$, and $N_{symbol}$ represents a quantity of symbols in one slot or a quantity of symbols in the RB of the paging information or the system information, $N_{ID}^{cell}$ represents a physical cell identifier of a cell, and mod represents a modulo operation.

According to the foregoing several possible implementations, the DMRS sequence of the broadcast signal can be most effectively mapped to the RE included in the RB of the broadcast signal, so that a transmission resource occupied by the DMRS sequence is reduced when the broadcast signal is correctly demodulated.

According to a second aspect, a demodulation reference signal sequence generation method is provided. The method includes receiving a first demodulation reference signal DMRS sequence of a broadcast signal from a base station, generating a second DMRS sequence based on a pseudo-random sequence c(m), where the second DMRS sequence is related to a quantity $N_{RB}$ of resource blocks RBs of the broadcast signal and a quantity $n_{RE}$ of resource elements REs occupied by the second DMRS sequence in one RB, and demodulating data in the broadcast signal based on the second DMRS sequence if a correlation between the second DMRS sequence and the first DMRS sequence meets a requirement.

In a possible implementation of the second aspect, the broadcast signal is paging information, a physical broadcast channel PBCH, or system information.

In a possible implementation of the second aspect, the generating a second demodulation reference signal DMRS sequence based on a pseudo-random sequence c(m) includes generating the second DMRS sequence based on the pseudo-random sequence c(m) according to a formula (1), where in the formula, $r_l(m)$ represents the second DMRS sequence, m represents a sequence index value of the second DMRS sequence, l represents an index value of a symbol in one slot:

$$r_l(m) = \frac{1}{\sqrt{2}}(1 - 2 \cdot c(2m)) + j \frac{1}{\sqrt{2}}(1 - 2 \cdot c(2m+1)), \quad (1)$$

$$m = 0, 1, \ldots, n_{RE} N_{RB} - 1.$$

In a possible implementation of the second aspect, a value of $n_{RE}$ is 3 or 4.

In a possible implementation of the second aspect, $N_{RB}$ is obtained by using a physical downlink control channel (PDCCH), a physical broadcast channel (PBCH), or remaining minimum system information (RMSI).

In a possible implementation of the second aspect, when the broadcast signal is paging information or system information, an initial value $c_{init}$ of the pseudo-random sequence c(m) is either one of initial values shown in the following formulas (1-1a) and (1-1b), and the initial value $c_{init}$ is used to generate the pseudo-random sequence c(m).

$$c_{init} = 2^{k_1} \cdot (n_{SS}+1) + 2^{k_2} \cdot N_{ID} + n_{RNTI} \quad (1\text{-}1a); \text{ and}$$

$$c_{init} = 2^{10} \cdot (m_2(n_{SS}+1) + l_2 + 1) \cdot (2 \cdot N_{ID}^{cell} + 1) + 2 \cdot N_{ID} + n_{RNTI} \quad (1\text{-}1b), \text{ where}$$

in the formulas, $N_{ID}$ represents a physical cell identifier $N_{ID}^{cell}$ of a cell or an identifier $N_{ID}^{SFN}$ of an area including a plurality of cells, a value of $k_1$ and a value of $k_2$ are constants from 0 to 64, $n_{RNTI}$ represents a value of a radio network temporary identifier, $n_{SS}$ represents an index value of a synchronization signal block in a synchronization signal burst set, $m_2$ represents a quantity of symbols in an RB of the paging information or the system information, and $l_2$ represents an index value of a symbol in the RB of the paging information or the system information.

According to a third aspect, a demodulation reference signal sequence mapping method is provided. The method includes: generating a demodulation reference signal DMRS sequence of a broadcast signal, and mapping the DMRS sequence to a resource element RE included in a resource block (RB) of the broadcast signal, according to a formula (2):

$$a_{k,l} = r_{l,n}(m) \quad (2), \text{ where}$$

in the formula, $a_{k,l}$ represents a location of an RE that is in the RB and that is occupied by a sequence code included in the DMRS sequence, k represents an index value of a frequency in a symbol, l represents an index value of a symbol in one slot or an index value of a symbol in the RB of the broadcast signal, n represents an index value of a resource scheduling unit of the broadcast signal, and m represents a sequence index value of the DMRS sequence.

In a possible implementation of the third aspect, the broadcast signal is paging information or system information.

In a possible implementation of the third aspect, the DMRS sequence is obtained according to a formula (1), where in the formula, $r_l(m)$ represents the DMRS sequence, c(m) represents a pseudo-random sequence, $n_{RE}$ represents a quantity of resource elements REs occupied by the DMRS sequence, $N_{RB}$ represents a quantity of resource blocks RBs of the broadcast signal, $n_{RE}$ is greater than or equal to 1, and l represents an index value of a symbol in one slot.

$$r_l(m) = \frac{1}{\sqrt{2}}(1 - 2 \cdot c(2m)) + j \frac{1}{\sqrt{2}}(1 - 2 \cdot c(2m+1)), \quad (1)$$

$$m = 0, 1, \ldots, n_{RE} N_{RB} - 1.$$

In a possible implementation of the third aspect, a value of k, a value of l, and a value of m are specifically obtained according to a formula (2-1a).

$$k = n_{density} \cdot m + v_{shift} + v$$

$$l = \{l_1\} \text{ or } \{l_1, l_2\}$$

$$m = 0, 1, \ldots, N_{RE} N_{RB} - 1$$

$$v_{shift} = N_{ID}^{cell} \mod n_{density} \quad (2\text{-}1a), \text{ where}$$

in the formula, $n_{density}$ represents density for transmitting the DMRS sequence in the RB, $v_{shift}$ represents a value of a first frequency offset of a start RE location of the DMRS sequence relative to an RE having a lowest frequency, v represents a value of a second frequency offset of the start RE location of the DMRS sequence relative to the RE having a lowest frequency, a value range of $l_1$, and a value range of $l_2$ are 0, 1, 2, . . . , and $N_{symbol}$, and $N_{symbol}$ represents a quantity of symbols in one slot or a quantity of symbols in an RB of the paging information or the system information, $N_{ID}^{cell}$ represents a physical cell identifier of a cell, and mod represents a modulo operation.

In a possible implementation of the third aspect, a specific relationship between a value of k and each of density $n_{density}$ for transmitting the DMRS sequence in the RB and a sum $v_{shift}+v$ of values of frequency offsets of an RE for transmitting the DMRS sequence relative to an RE having a lowest frequency in the RB is any one shown in the following table.

| Values of $n_{density}$ and $v_{shift} + v$ | Value of k |
| --- | --- |
| $n_{density}$ = 2 and $v_{shift}$ + v = 0 | 0, 2, 4, 6, . . . , $12N_{RB}$ − 2 |
| $n_{density}$ = 2 and $v_{shift}$ + v = 1 | 1, 3, 5, 7, . . . , $12N_{RB}$ − 1 |
| $n_{density}$ = 3 and $v_{shift}$ + v = 0 | 0, 3, 6, 9, . . . , $12N_{RB}$ − 3 |
| $n_{density}$ = 3 and $v_{shift}$ + v = 1 | 1, 4, 7, 10, . . . , $12N_{RB}$ − 2 |
| $n_{density}$ = 3 and $v_{shift}$ + v = 2 | 2, 5, 8, 11, . . . , $12N_{RB}$ − 1 |
| $n_{density}$ = 4 and $v_{shift}$ + v = 0 | 0, 4, 8, 12, . . . , $12N_{RB}$ − 4 |
| $n_{density}$ = 4 and $v_{shift}$ + v = 1 | 1, 5, 9, 13, . . . , $12N_{RB}$ − 3 |
| $n_{density}$ = 4 and $v_{shift}$ + v = 2 | 2, 6, 10, 14, . . . , $12N_{RB}$ − 2 |
| $n_{density}$ = 4 and $v_{shift}$ + v = 3 | 3, 7, 11, 15, . . . , $12N_{RB}$ − 1 |
| $n_{density}$ = 6 and $v_{shift}$ + v = 0 | 0, 6, 12, 18, . . . , $12N_{RB}$ − 6 |
| $n_{density}$ = 6 and $v_{shift}$ + v = 1 | 1, 7, 13, 19, . . . , $12N_{RB}$ − 5 |
| $n_{density}$ = 6 and $v_{shift}$ + v = 2 | 2, 8, 14, 20, . . . , $12N_{RB}$ − 4 |
| $n_{density}$ = 6 and $v_{shift}$ + v = 3 | 3, 9, 15, 21, . . . , $12N_{RB}$ − 3 |
| $n_{density}$ = 6 and $v_{shift}$ + v = 4 | 4, 10, 16, 22, . . . , $12N_{RB}$ − 2 |
| $n_{density}$ = 6 and $v_{shift}$ + v = 5 | 5, 11, 17, 23, . . . , $12N_{RB}$ − 1 |
| $n_{density}$ = 12 and $v_{shift}$ + v = 0 | 0, 12, 24, 36, . . . , $12N_{RB}$ − 12 |
| $n_{density}$ = 12 and $v_{shift}$ + v = 1 | 1, 13, 25, 37, . . . , $12N_{RB}$ − 11 |
| $n_{density}$ = 12 and $v_{shift}$ + v = 2 | 2, 14, 26, 38, . . . , $12N_{RB}$ − 10 |
| $n_{density}$ = 12 and $v_{shift}$ + v = 3 | 3, 15, 27, 39, . . . , $12N_{RB}$ − 9 |
| $n_{density}$ = 12 and $v_{shift}$ + v = 4 | 4, 16, 28, 40, . . . , $12N_{RB}$ − 8 |
| $n_{density}$ = 12 and $v_{shift}$ + v = 5 | 5, 17, 29, 41, . . . , $12N_{RB}$ − 7 |
| $n_{density}$ = 12 and $v_{shift}$ + v = 6 | 6, 18, 30, 42, . . . , $12N_{RB}$ − 6 |
| $n_{density}$ = 12 and $v_{shift}$ + v = 7 | 7, 19, 31, 43, . . . , $12N_{RB}$ − 5 |
| $n_{density}$ = 12 and $v_{shift}$ + v = 8 | 8, 20, 32, 44, . . . , $12N_{RB}$ − 4 |
| $n_{density}$ = 12 and $v_{shift}$ + v = 9 | 9, 21, 33, 45, . . . , $12N_{RB}$ − 3 |
| $n_{density}$ = 12 and $v_{shift}$ + v = 10 | 10, 22, 34, 46, . . . , $12N_{RB}$ − 2 |
| $n_{density}$ = 12 and $v_{shift}$ + v = 11 | 11, 23, 35, 47, . . . , $12N_{RB}$ − 1 |

In a possible implementation of the third aspect, if a quantity of symbols occupied by the DMRS sequence is $N_{symbol}^{DMRS}$, a specific relationship between $N_{symbol}^{DMRS}$ and v is as follows.

| | First symbol | Second symbol | Third symbol | Fourth symbol |
| --- | --- | --- | --- | --- |
| $N_{symbol}^{DMRS}$ = 1 | v = 0 | NA | NA | NA |
| $N_{symbol}^{DMRS}$ = 2 | v = 0 | v = $n_{density}$/2 or v = 0 | NA | NA |
| $N_{symbol}^{DMRS}$ = 3 | v = 0 | v = $\lfloor n_{density}/3 \rfloor$ | v = $\lfloor 2n_{density}/3 \rfloor$ | NA |
| $N_{symbol}^{DMRS}$ = 4 | v = 0 | v = $\lfloor n_{density}/4 \rfloor$ | v = $\lfloor n_{density}/2 \rfloor$ | v = $\lfloor 3n_{density}/4 \rfloor$ | where in the formula, NA represents null, and $\lfloor g \rfloor$ represents rounding down to the nearest integer.

According to a fourth aspect, a demodulation reference signal sequence obtaining method is provided. The method includes receiving a demodulation reference signal DMRS sequence that is sent by a base station by using a resource block (RB) of a broadcast signal, determining a location of the DMRS sequence in a resource element RE included in the RB of the broadcast signal, according to a formula (2), and obtaining the DMRS sequence from the RB of the broadcast signal based on the location of the DMRS sequence.

$$a_{k,l} = r_{l,n}(m) \quad (2),$$ where in the formula, $a_{k,l}$ represents a location of an RE that is in the RB and that is occupied by a sequence code included in the DMRS sequence, $k$ represents an index value of a frequency in a symbol, $l$ represents an index value of a symbol in one slot or an index value of a symbol in the RB of the broadcast signal, $n$ represents an index value of a resource scheduling unit of the broadcast signal, and $m$ represents a sequence index value of the DMRS sequence.

In a possible implementation of the fourth aspect, the broadcast signal is paging information or system information.

In a possible implementation of the fourth aspect, the DMRS sequence is obtained by the base station according to a formula (1), where in the formula, $r_l(m)$ represents the DMRS sequence, c(m) represents a pseudo-random sequence, $n_{RE}$ represents a quantity of resource elements REs occupied by the DMRS sequence, $N_{RB}$ represents a quantity of resource blocks RBs of the broadcast signal, $n_{RE}$ is greater than or equal to 1, and l represents an index value of a symbol in one slot.

$$r_l(m) = \frac{1}{\sqrt{2}}(1 - 2 \cdot c(2m)) + j\frac{1}{\sqrt{2}}(1 - 2 \cdot c(2m+1)), \quad (1)$$

$$m = 0, 1, \ldots, n_{RE}N_{RB} - 1.$$

In a possible implementation of the fourth aspect, a value of k, a value of l, and a value of m are specifically obtained according to a formula (2-1a).

$$k = n_{density}m + v_{shift} + v$$

$$l = \{l_1\} \text{ or } \{l_1, l_2\}$$

$$m = 0, 1, \ldots, N_{RE}N_{RB} - 1$$

$$v_{shift} = N_{ID}^{cell} \mod n_{density} \quad (2\text{-}1a),$$ where in the formula, $n_{density}$ represents density for transmitting a DMRS sequence in the RB, and is specifically a quantity of REs that separate, in terms of frequency, two adjacent REs for transmitting the DMRS sequence, $v_{shift}$ represents a value of a first frequency offset of a start RE location of the DMRS sequence relative to an RE having a lowest frequency, the value of the first frequency offset is expressed in a quantity of REs, and a value of $v_{shift}$ is an integer from 0 to 11, v represents a value of a second frequency offset of the start RE location of the DMRS sequence relative to the RE having a lowest frequency, the value of the second frequency offset is expressed in a quantity of REs, a value of v is an integer from −6 to 6, and $v = v_{shift} - n_{density}$ when $v_{shift} + v \geq n_{density}$, a value range of $l_1$ and a value range of $l_2$ are 0, 1, 2, . . . , and $N_{symbol}$, $N_{symbol}$ represents a quantity of symbols in one slot or a quantity of symbols in an RB of the paging information or the system information, $N_{ID}^{cell}$ represents a physical cell identifier of a cell, and mod represents a modulo operation.

In a possible implementation of the fourth aspect, a specific relationship between a value of k and each of density $n_{density}$ for transmitting the DMRS sequence in the RB and a sum $v_{shift}+v$ of values of frequency offsets of an RE for transmitting the DMRS sequence relative to an RE having a lowest frequency in the RB is any one shown in the following table.

| Values of $n_{density}$ and $v_{shift} + v$ | Value of k |
|---|---|
| $n_{density} = 2$ and $v_{shift} + v = 0$ | 0, 2, 4, 6, . . . , $12N_{RB} - 2$ |
| $n_{density} = 2$ and $v_{shift} + v = 1$ | 1, 3, 5, 7, . . . , $12N_{RB} - 1$ |
| $n_{density} = 3$ and $v_{shift} + v = 0$ | 0, 3, 6, 9, . . . , $12N_{RB} - 3$ |
| $n_{density} = 3$ and $v_{shift} + v = 1$ | 1, 4, 7, 10, . . . , $12N_{RB} - 2$ |
| $n_{density} = 3$ and $v_{shift} + v = 2$ | 2, 5, 8, 11, . . . , $12N_{RB} - 1$ |
| $n_{density} = 4$ and $v_{shift} + v = 0$ | 0, 4, 8, 12, . . . , $12N_{RB} - 4$ |
| $n_{density} = 4$ and $v_{shift} + v = 1$ | 1, 5, 9, 13, . . . , $12N_{RB} - 3$ |
| $n_{density} = 4$ and $v_{shift} + v = 2$ | 2, 6, 10, 14, . . . , $12N_{RB} - 2$ |
| $n_{density} = 4$ and $v_{shift} + v = 3$ | 3, 7, 11, 15, . . . , $12N_{RB} - 1$ |
| $n_{density} = 6$ and $v_{shift} + v = 0$ | 0, 6, 12, 18, . . . , $12N_{RB} - 6$ |
| $n_{density} = 6$ and $v_{shift} + v = 1$ | 1, 7, 13, 19, . . . , $12N_{RB} - 5$ |
| $n_{density} = 6$ and $v_{shift} + v = 2$ | 2, 8, 14, 20, . . . , $12N_{RB} - 4$ |
| $n_{density} = 6$ and $v_{shift} + v = 3$ | 3, 9, 15, 21, . . . , $12N_{RB} - 3$ |
| $n_{density} = 6$ and $v_{shift} + v = 4$ | 4, 10, 16, 22, . . . , $12N_{RB} - 2$ |
| $n_{density} = 6$ and $v_{shift} + v = 5$ | 5, 11, 17, 23, . . . , $12N_{RB} - 1$ |
| $n_{density} = 12$ and $v_{shift} + v = 0$ | 0, 12, 24, 36, . . . , $12N_{RB} - 12$ |
| $n_{density} = 12$ and $v_{shift} + v = 1$ | 1, 13, 25, 37, . . . , $12N_{RB} - 11$ |
| $n_{density} = 12$ and $v_{shift} + v = 2$ | 2, 14, 26, 38, . . . , $12N_{RB} - 10$ |
| $n_{density} = 12$ and $v_{shift} + v = 3$ | 3, 15, 27, 39, . . . , $12N_{RB} - 9$ |
| $n_{density} = 12$ and $v_{shift} + v = 4$ | 4, 16, 28, 40, . . . , $12N_{RB} - 8$ |
| $n_{density} = 12$ and $v_{shift} + v = 5$ | 5, 17, 29, 41, . . . , $12N_{RB} - 7$ |
| $n_{density} = 12$ and $v_{shift} + v = 6$ | 6, 18, 30, 42, . . . , $12N_{RB} - 6$ |
| $n_{density} = 12$ and $v_{shift} + v = 7$ | 7, 19, 31, 43, . . . , $12N_{RB} - 5$ |
| $n_{density} = 12$ and $v_{shift} + v = 8$ | 8, 20, 32, 44, . . . , $12N_{RB} - 4$ |
| $n_{density} = 12$ and $v_{shift} + v = 9$ | 9, 21, 33, 45, . . . , $12N_{RB} - 3$ |
| $n_{density} = 12$ and $v_{shift} + v = 10$ | 10, 22, 34, 46, . . . , $12N_{RB} - 2$ |
| $n_{density} = 12$ and $v_{shift} + v = 11$ | 11, 23, 35, 47, . . . , $12N_{RB} - 1$ |

In a possible implementation of the fourth aspect, if a quantity of symbols occupied by the DMRS sequence is $N_{symbol}^{DMRS}$, a specific relationship between $N_{symbol}^{DMRS}$ and v is as follows.

|  | First symbol | Second symbol | Third symbol | Fourth symbol |
|---|---|---|---|---|
| $N_{symbol}^{DMRS} = 1$ | v = 0 | NA | NA | NA |
| $N_{symbol}^{DMRS} = 2$ | v = 0 | v = $n_{density}/2$ or v = 0 | NA | NA |
| $N_{symbol}^{DMRS} = 3$ | v = 0 | v = $\lfloor n_{density}/3 \rfloor$ | v = $\lfloor 2n_{density}/3 \rfloor$ | NA |
| $N_{symbol}^{DMRS} = 4$ | v = 0 | v = $\lfloor n_{density}/4 \rfloor$ | v = $\lfloor n_{density}/2 \rfloor$ | v = $\lfloor 3n_{density}/4 \rfloor$ | in the formula, $\lfloor g \rfloor$ represents rounding down to the nearest integer.

According to the foregoing implementations, the DMRS sequence of the broadcast signal can be most effectively mapped to the RE included in the RB of the broadcast signal, so that a transmission resource occupied by the DMRS sequence is reduced when the broadcast signal is correctly demodulated.

According to a fifth aspect, an apparatus is provided. The apparatus includes a processing unit, configured to generate a demodulation reference signal DMRS sequence of a broadcast signal based on a pseudo-random sequence c(m), where the DMRS sequence is related to a quantity $N_{RB}$ of resource blocks RBs of the broadcast signal and a quantity $n_{RE}$ of resource elements REs occupied by the DMRS sequence in one RB, where the processing unit is configured to map the DMRS sequence to one or more symbols.

In a possible implementation of the fifth aspect, the broadcast signal is paging information, a physical broadcast channel PBCH, or system information.

In a possible implementation of the fifth aspect, the processing unit is specifically configured to generate the DMRS sequence of the broadcast signal based on the pseudo-random sequence c(m) according to a formula (1), where in the formula, l represents an index value of a symbol in one slot, $r_l(m)$ represents the DMRS sequence, and m represents a sequence index value of the DMRS sequence.

$$r_l(m) = \frac{1}{\sqrt{2}}(1 - 2 \cdot c(2m)) + j\frac{1}{\sqrt{2}}(1 - 2 \cdot c(2m+1)), \quad (1)$$

$$m = 0, 1, \ldots, n_{RE}N_{RB} - 1.$$

In a possible implementation of the fifth aspect, a value of $n_{RE}$ is 3 or 4.

In a possible implementation of the fifth aspect, when the broadcast signal is paging information or system information, an initial value $c_{init}$ of the pseudo-random sequence c(m) is either one of initial values shown in the following formulas (1-1a) and (1-1b), and the initial value $c_{init}$ is used to generate the pseudo-random sequence c(m).

$$c_{init} = 2^{k_1} \cdot (n_{SS}+1) + 2^{k_2} \cdot N_{ID} + n_{RNTI} \quad (1-1a), \text{ and}$$

$$c_{init} = 2^{10} \cdot (m_2(n_{SS}+1) + l_2+1) \cdot (2 \cdot N_{ID}^{cell}+1) + 2 \cdot N_{ID} + n_{RNTI} \quad (1-1b), \text{ where}$$

in the formulas, $N_{ID}$ represents a physical cell identifier $N_{ID}^{cell}$ of a cell or an identifier $N_{ID}^{SFN}$ of an area including a plurality of cells, a value of $k_1$ and a value of $k_2$ are constants from 0 to 64, $n_{RNTI}$ represents a value of a radio network temporary identifier, $n_{SS}$ represents an index value of a synchronization signal block in a synchronization signal burst set, $m_2$ represents a quantity of symbols in an RB of the paging information or the system information, and $l_2$ represents an index value of a symbol in the RB of the paging information or the system information.

In a possible implementation of the fifth aspect, the processing unit is specifically configured to map the DMRS sequence to a resource element RE included in the resource block (RB) of the broadcast signal, according to a formula (2).

$$a_{k,l} = r_{l,n}(m) \quad (2), \text{ where}$$

in the formula, $a_{k,l}$ represents a location of an RE that is in the RB and that is occupied by a sequence code included in the DMRS sequence, k represents an index value of a frequency in a symbol, l represents an index value of a symbol in one slot or an index value of a symbol in the RB of the broadcast signal, n represents an index value of a resource scheduling unit of the broadcast signal, and m represents a sequence index value of the DMRS sequence.

In another possible implementation of the fifth aspect, a value of k, a value of l, and a value of m are specifically obtained according to a formula (2-1a).

$$k = n_{density} m + v_{shift} + v$$

$$l = \{l_1\} \text{ or } \{l_1, l_2\}$$

$$m = 0, 1, \ldots, N_{RE} N_{RB} - 1$$

$$v_{shift} = N_{ID}^{cell} \bmod n_{density} \qquad (2\text{-}1a), \text{ where}$$

in the formula, $n_{density}$ represents density for transmitting the DMRS sequence in the RB, $v_{shift}$ represents a value of a frequency offset of a start RE location of the DMRS sequence relative to an RE having a lowest frequency, v represents a value of a frequency offset of the start RE location of the DMRS sequence relative to the RE having a lowest frequency, a value range of $l_1$ and a value range of $l_2$ are 0, 1, 2, . . . , and $N_{symbol}$, and $N_{symbol}$ represents a quantity of symbols in one slot or a quantity of symbols in the RB of the paging information or the system information, $N_{ID}^{cell}$ represents a physical cell identifier of a cell, and mod represents a modulo operation.

In another possible implementation of the fifth aspect, the apparatus is a base station or a chip in a base station.

According to a sixth aspect, an apparatus is provided. The apparatus includes a receiving unit, configured to receive a first demodulation reference signal DMRS sequence of a broadcast signal from a base station, and a processing unit, configured to generate a second DMRS sequence based on a pseudo-random sequence c(m), where the second DMRS sequence is related to a quantity $N_{RB}$ of resource blocks RBs of the broadcast signal and a quantity $n_{RE}$ of resource elements REs occupied by the second DMRS sequence in one RB, where the processing unit is further configured to demodulate data in the broadcast signal based on the second DMRS sequence if a correlation between the second DMRS sequence and the first DMRS sequence meets a requirement.

In a possible implementation of the sixth aspect, the broadcast signal is paging information, a physical broadcast channel PBCH, or system information.

In a possible implementation of the sixth aspect, the processing unit is specifically configured to generate the DMRS sequence based on the pseudo-random sequence c(m) according to a formula (1), where in the formula, $r_l(m)$ represents the DMRS sequence, m represents a sequence index value of the DMRS sequence, and l represents an index value of a symbol in one slot.

$$r_l(m) = \frac{1}{\sqrt{2}}(1 - 2 \cdot c(2m)) + j\frac{1}{\sqrt{2}}(1 - 2 \cdot c(2m+1)), \qquad (1)$$

$$m = 0, 1, \ldots, n_{RE} N_{RB} - 1.$$

In a possible implementation of the sixth aspect, a value of $n_{RE}$ is 3 or 4.

In a possible implementation of the sixth aspect, the receiving unit is further configured to obtain $N_{RB}$ by using a physical downlink control channel PDCCH, a physical broadcast channel PBCH, or RMSI.

In a possible implementation of the sixth aspect, when the broadcast signal is paging information or system information, an initial value $c_{init}$ of the pseudo-random sequence c(m) is either one of initial values shown in the following formulas (1-1a) and (1-1b), and the initial value $c_{init}$ is used to generate the pseudo-random sequence c(m).

$$c_{init} = 2^{k_1} \cdot (n_{SS}+1) + 2^{k_2} \cdot N_{ID} + n_{RNTI} \qquad (1\text{-}1a); \text{ and}$$

$$c_{init} = 2^{10}(m_2(n_{SS}+1) = l_2+1) \cdot (2 \cdot N_{ID}^{cell}+1) + 2 \cdot N_{ID} + n_{RNTI} \quad (1\text{-}1b), \text{ where}$$

in the formulas, $N_{ID}$ represents a physical cell identifier $N_{ID}^{cell}$ of a cell or an identifier $N_{ID}^{SFN}$ of an area including a plurality of cells, a value of $k_1$ and a value of $k_2$ are constants from 0 to 64, $n_{RNTI}$ represents a value of a radio network temporary identifier, $n_{SS}$ represents an index value of a synchronization signal block in a synchronization signal burst set, $m_2$ represents a quantity of symbols in an RB of the paging information or the system information, and $l_2$ represents an index value of a symbol in the RB of the paging information or the system information.

In another possible implementation of the sixth aspect, the apparatus is a terminal device or a chip in a terminal device.

According to a seventh aspect, an apparatus is provided. The apparatus includes a processing unit, configured to generate a demodulation reference signal DMRS sequence of a broadcast signal, where the processing unit is further configured to map the DMRS sequence to a resource element RE included in a resource block (RB) of the broadcast signal, according to a formula (2).

$$a_{k,l} = r_{l,n}(m) \qquad (2), \text{ where}$$

in the formula, $a_{k,l}$ represents a location of an RE that is in the RB and that is occupied by a sequence code included in the DMRS sequence, k represents an index value of a frequency in a symbol, l represents an index value of a symbol in one slot or an index value of a symbol in the RB of the broadcast signal, n represents an index value of a resource scheduling unit of the broadcast signal, and m represents a sequence index value of the DMRS sequence.

In a possible implementation of the seventh aspect, the broadcast signal is paging information or system information.

In a possible implementation of the seventh aspect, the DMRS sequence is obtained according to a formula (1), where in the formula, $r_l(m)$ represents the DMRS sequence, c(m) represents a pseudo-random sequence, $n_{RE}$ represents a quantity of resource elements REs occupied by the DMRS sequence, $N_{RB}$ represents a quantity of resource blocks RBs of the broadcast signal, $n_{RE}$ is greater than or equal to 1, and l represents an index value of a symbol in one slot.

$$r_l(m) = \frac{1}{\sqrt{2}}(1 - 2 \cdot c(2m)) + j\frac{1}{\sqrt{2}}(1 - 2 \cdot c(2m+1)), \qquad (1)$$

$$m = 0, 1, \ldots, n_{RE} N_{RB} - 1.$$

In a possible implementation of the seventh aspect, a value of k, a value of l, and a value of m are specifically obtained according to a formula (2-1a).

$$k = n_{density} m + v_{shift} + v$$

$$l = \{l_1\} \text{ or } \{l_1, l_2\}$$

$$m = 0, 1, \ldots, N_{RE} N_{RB} - 1$$

$$v_{shift} = N_{ID}^{cell} \bmod n_{density} \qquad (2\text{-}1a), \text{ where}$$

in the formula, $n_{density}$ represents density for transmitting the DMRS sequence in the RB, $v_{shift}$ represents a value of a frequency offset of a start RE location of the DMRS sequence relative to an RE having a lowest frequency, v represents a value of a frequency offset of the start RE location of the DMRS sequence relative to the RE having a lowest frequency, a value range of $l_1$ and a value range of $l_2$ are 0, 1, 2, . . . , and $N_{symbol}$, and $N_{symbol}$ represents a quantity of symbols in one slot or a quantity of symbols in an RB of the paging information or the system information, $N_{ID}^{cell}$ represents a physical cell identifier of a cell, and mod represents a modulo operation.

In a possible implementation of the seventh aspect, a specific relationship between a value of k and each of density $n_{density}$ for transmitting the DMRS sequence in the RB and a sum $v_{shift}+v$ of values of frequency offsets of an RE for transmitting the DMRS sequence relative to an RE having a lowest frequency in the RB is any one shown in the following table.

In a possible implementation of the seventh aspect, a specific relationship between a value of k and each of density $n_{density}$ for transmitting the DMRS sequence in the RB and a sum $v_{shift}+v$ of values of frequency offsets of an RE for transmitting the DMRS sequence relative to an RE having a lowest frequency in the RB is any one shown in the following table.

| Values of $n_{density}$ and $v_{shift} + v$ | Value of k |
| --- | --- |
| $n_{density} = 2$ and $v_{shift} + v = 0$ | 0, 2, 4, 6, . . . , $12N_{RB} - 2$ |
| $n_{density} = 2$ and $v_{shift} + v = 1$ | 1, 3, 5, 7, . . . , $12N_{RB} - 1$ |
| $n_{density} = 3$ and $v_{shift} + v = 0$ | 0, 3, 6, 9, . . . , $12N_{RB} - 3$ |
| $n_{density} = 3$ and $v_{shift} + v = 1$ | 1, 4, 7, 10, . . . , $12N_{RB} - 2$ |
| $n_{density} = 3$ and $v_{shift} + v = 2$ | 2, 5, 8, 11, . . . , $12N_{RB} - 1$ |
| $n_{density} = 4$ and $v_{shift} + v = 0$ | 0, 4, 8, 12, . . . , $12N_{RB} - 4$ |
| $n_{density} = 4$ and $v_{shift} + v = 1$ | 1, 5, 9, 13, . . . , $12N_{RB} - 3$ |
| $n_{density} = 4$ and $v_{shift} + v = 2$ | 2, 6, 10, 14, . . . , $12N_{RB} - 2$ |
| $n_{density} = 4$ and $v_{shift} + v = 3$ | 3, 7, 11, 15, . . . , $12N_{RB} - 1$ |
| $n_{density} = 6$ and $v_{shift} + v = 0$ | 0, 6, 12, 18, . . . , $12N_{RB} - 6$ |
| $n_{density} = 6$ and $v_{shift} + v = 1$ | 1, 7, 13, 19, . . . , $12N_{RB} - 5$ |
| $n_{density} = 6$ and $v_{shift} + v = 2$ | 2, 8, 14, 20, . . . , $12N_{RB} - 4$ |
| $n_{density} = 6$ and $v_{shift} + v = 3$ | 3, 9, 15, 21, . . . , $12N_{RB} - 3$ |
| $n_{density} = 6$ and $v_{shift} + v = 4$ | 4, 10, 16, 22, . . . , $12N_{RB} - 2$ |
| $n_{density} = 6$ and $v_{shift} + v = 5$ | 5, 11, 17, 23, . . . , $12N_{RB} - 1$ |
| $n_{density} = 12$ and $v_{shift} + v = 0$ | 0, 12, 24, 36, . . . , $12N_{RB} - 12$ |
| $n_{density} = 12$ and $v_{shift} + v = 1$ | 1, 13, 25, 37, . . . , $12N_{RB} - 11$ |
| $n_{density} = 12$ and $v_{shift} + v = 2$ | 2, 14, 26, 38, . . . , $12N_{RB} - 10$ |
| $n_{density} = 12$ and $v_{shift} + v = 3$ | 3, 15, 27, 39, . . . , $12N_{RB} - 9$ |
| $n_{density} = 12$ and $v_{shift} + v = 4$ | 4, 16, 28, 40, . . . , $12N_{RB} - 8$ |
| $n_{density} = 12$ and $v_{shift} + v = 5$ | 5, 17, 29, 41, . . . , $12N_{RB} - 7$ |
| $n_{density} = 12$ and $v_{shift} + v = 6$ | 6, 18, 30, 42, . . . , $12N_{RB} - 6$ |
| $n_{density} = 12$ and $v_{shift} + v = 7$ | 7, 19, 31, 43, . . . , $12N_{RB} - 5$ |
| $n_{density} = 12$ and $v_{shift} + v = 8$ | 8, 20, 32, 44, . . . , $12N_{RB} - 4$ |
| $n_{density} = 12$ and $v_{shift} + v = 9$ | 9, 21, 33, 45, . . . , $12N_{RB} - 3$ |
| $n_{density} = 12$ and $v_{shift} + v = 10$ | 10, 22, 34, 46, . . . , $12N_{RB} - 2$ |
| $n_{density} = 12$ and $v_{shift} + v = 11$ | 11, 23, 35, 47, . . . , $12N_{RB} - 1$ |

In a possible implementation of the seventh aspect, if a quantity of symbols occupied by the DMRS sequence is $N_{symbol}^{DMRS}$, a specific relationship between $N_{symbol}^{DMRS}$ and v is as follows.

| | First symbol | Second symbol | Third symbol | Fourth symbol |
| --- | --- | --- | --- | --- |
| $N_{symbol}^{DMRS} = 1$ | $v = 0$ | NA | NA | NA |
| $N_{symbol}^{DMRS} = 2$ | $v = 0$ | $v = n_{density}/2$ or $v = 0$ | NA | NA |
| $N_{symbol}^{DMRS} = 3$ | $v = 0$ | $v = \lfloor n_{density}/3 \rfloor$ | $v = \lfloor 2n_{density}/3 \rfloor$ | NA |
| $N_{symbol}^{DMRS} = 4$ | $v = 0$ | $v = \lfloor n_{density}/4 \rfloor$ | $v = \lfloor n_{density}/2 \rfloor$ | $v = \lfloor 3n_{density}/4 \rfloor$ | where in the formula, NA represents null, and $\lfloor g \rfloor$ represents rounding down to the nearest integer.

In another possible implementation of the seventh aspect, the apparatus is a base station or a chip inside a base station.

According to an eighth aspect, an apparatus is provided. The apparatus includes a receiving unit, configured to receive a demodulation reference signal DMRS sequence that is sent by a base station by using a resource block (RB) of a broadcast signal, and a processing unit, configured to determine a location of the DMRS sequence in a resource element RE included in the RB of the broadcast signal, according to a formula (2), where the processing unit is further configured to obtain the DMRS sequence from the RB of the broadcast signal based on the location of the DMRS sequence.

$$a_{k,l} = r_{l,n}(m) \qquad (2),\text{ where}$$

in the formula, $a_{k,l}$ represents a location of an RE that is in the RB and that is occupied by a sequence code included in the DMRS sequence, k represents an index value of a frequency in a symbol, l represents an index value of a symbol in one slot or an index value of a symbol in the RB of the broadcast signal, n represents an index value of a resource scheduling unit of the broadcast signal, and m represents a sequence index value of the DMRS sequence.

In a possible implementation of the eighth aspect, the broadcast signal is paging information or system information.

In a possible implementation of the eighth aspect, the DMRS sequence is obtained by the base station according to a formula (1), where in the formula, $r_l(m)$ represents the DMRS sequence, c(m) represents a pseudo-random sequence, $n_{RE}$ represents a quantity of resource elements REs occupied by the DMRS sequence, $N_{RB}$ represents a quantity of resource blocks RBs of the broadcast signal, $n_{RE}$ is greater than or equal to 1, and l represents an index value of a symbol in one slot.

$$r_l(m) = \frac{1}{\sqrt{2}}(1 - 2 \cdot c(2m)) + j\frac{1}{\sqrt{2}}(1 - 2 \cdot c(2m+1)), \qquad (1)$$

$$m = 0, 1, \ldots, n_{RE}N_{RB} - 1.$$

In a possible implementation of the eighth aspect, a value of k, a value of l, and a value of m are specifically obtained according to a formula (2-1a).

$$k = n_{density}m + v_{shift} + v$$

$$l = \{l_1\} \text{ or } \{l_1, l_2\}$$

$$m = 0, 1, \ldots, N_{RE}N_{RB} - 1$$

$$v_{shift} = N_{ID}^{cell} \bmod n_{density} \qquad (2\text{-}1a),\text{ where}$$

in the formula, $n_{density}$ represents density for transmitting the DMRS sequence in the RB, $v_{shift}$ represents a value of a first frequency offset of a start RE location of the DMRS sequence relative to an RE having a lowest frequency, v represents a value of a second frequency offset of the start RE location of the DMRS sequence relative to the RE having a lowest frequency, a value range of $l_1$ and a value range of $l_2$ are 0, 1, 2, . . . , and $N_{symbol}$, and $N_{symbol}$ represents a quantity of symbols in one slot or a quantity of symbols in an RB of the paging information or the system information, $N_{ID}^{cell}$ represents a physical cell identifier of a cell, and mod represents a modulo operation.

In a possible implementation of the eighth aspect, the broadcast signal is paging information or system information.

In a possible implementation of the eighth aspect, a specific relationship between a value of k and each of density $n_{density}$ for transmitting the DMRS sequence in the RB and a sum $v_{shift}$ of values of frequency offsets of an RE for transmitting the DMRS sequence relative to an RE having a lowest frequency in the RB is any one shown in the following table.

| Values of $n_{density}$ and $v_{shift} + v$ | Value of k |
|---|---|
| $n_{density}$ = 2 and $v_{shift} + v$ = 0 | 0, 2, 4, 6, . . . , $12N_{RB}$ − 2 |
| $n_{density}$ = 2 and $v_{shift} + v$ = 1 | 1, 3, 5, 7, . . . , $12N_{RB}$ − 1 |
| $n_{density}$ = 3 and $v_{shift} + v$ = 0 | 0, 3, 6, 9, . . . , $12N_{RB}$ − 3 |
| $n_{density}$ = 3 and $v_{shift} + v$ = 1 | 1, 4, 7, 10, . . . , $12N_{RB}$ − 2 |
| $n_{density}$ = 3 and $v_{shift} + v$ = 2 | 2, 5, 8, 11, . . . , $12N_{RB}$ − 1 |
| $n_{density}$ = 4 and $v_{shift} + v$ = 0 | 0, 4, 8, 12, . . . , $12N_{RB}$ − 4 |
| $n_{density}$ = 4 and $v_{shift} + v$ = 1 | 1, 5, 9, 13, . . . , $12N_{RB}$ − 3 |
| $n_{density}$ = 4 and $v_{shift} + v$ = 2 | 2, 6, 10, 14, . . . , $12N_{RB}$ − 2 |
| $n_{density}$ = 4 and $v_{shift} + v$ = 3 | 3, 7, 11, 15, . . . , $12N_{RB}$ − 1 |
| $n_{density}$ = 6 and $v_{shift} + v$ = 0 | 0, 6, 12, 18, . . . , $12N_{RB}$ − 6 |
| $n_{density}$ = 6 and $v_{shift} + v$ = 1 | 1, 7, 13, 19, . . . , $12N_{RB}$ − 5 |
| $n_{density}$ = 6 and $v_{shift} + v$ = 2 | 2, 8, 14, 20, . . . , $12N_{RB}$ − 4 |
| $n_{density}$ = 6 and $v_{shift} + v$ = 3 | 3, 9, 15, 21, . . . , $12N_{RB}$ − 3 |
| $n_{density}$ = 6 and $v_{shift} + v$ = 4 | 4, 10, 16, 22, . . . , $12N_{RB}$ − 2 |
| $n_{density}$ = 6 and $v_{shift} + v$ = 5 | 5, 11, 17, 23, . . . , $12N_{RB}$ − 1 |
| $n_{density}$ = 12 and $v_{shift} + v$ = 0 | 0, 12, 24, 36, . . . , $12N_{RB}$ − 12 |
| $n_{density}$ = 12 and $v_{shift} + v$ = 1 | 1, 13, 25, 37, . . . , $12N_{RB}$ − 11 |
| $n_{density}$ = 12 and $v_{shift} + v$ = 2 | 2, 14, 26, 38, . . . , $12N_{RB}$ − 10 |
| $n_{density}$ = 12 and $v_{shift} + v$ = 3 | 3, 15, 27, 39, . . . , $12N_{RB}$ − 9 |
| $n_{density}$ = 12 and $v_{shift} + v$ = 4 | 4, 16, 28, 40, . . . , $12N_{RB}$ − 8 |
| $n_{density}$ = 12 and $v_{shift} + v$ = 5 | 5, 17, 29, 41, . . . , $12N_{RB}$ − 7 |
| $n_{density}$ = 12 and $v_{shift} + v$ = 6 | 6, 18, 30, 42, . . . , $12N_{RB}$ − 6 |
| $n_{density}$ = 12 and $v_{shift} + v$ = 7 | 7, 19, 31, 43, . . . , $12N_{RB}$ − 5 |
| $n_{density}$ = 12 and $v_{shift} + v$ = 8 | 8, 20, 32, 44, . . . , $12N_{RB}$ − 4 |
| $n_{density}$ = 12 and $v_{shift} + v$ = 9 | 9, 21, 33, 45, . . . , $12N_{RB}$ − 3 |
| $n_{density}$ = 12 and $v_{shift} + v$ = 10 | 10, 22, 34, 46, . . . , $12N_{RB}$ − 2 |
| $n_{density}$ = 12 and $v_{shift} + v$ = 11 | 11, 23, 35, 47, . . . , $12N_{RB}$ − 1 |

In a possible implementation of the eighth aspect, if a quantity of symbols occupied by the DMRS sequence is $N_{symbol}^{DMRS}$, a specific relationship between $N_{symbol}^{DMRS}$ and v is as follows.

| | First symbol | Second symbol | Third symbol | Fourth symbol |
|---|---|---|---|---|
| $N_{symbol}^{DMRS}$ = 1 | v = 0 | NA | NA | NA |
| $N_{symbol}^{DMRS}$ = 2 | v = 0 | v = $n_{density}$/2 or v = 0 | NA | NA |
| $N_{symbol}^{DMRS}$ = 3 | v = 0 | v = $\lfloor n_{density}/3 \rfloor$ | v = $\lfloor 2n_{density}/3 \rfloor$ | NA |
| $N_{symbol}^{DMRS}$ = 4 | v = 0 | v = $\lfloor n_{density}/4 \rfloor$ | v = $\lfloor n_{density}/2 \rfloor$ | v = $\lfloor 3n_{density}/4 \rfloor$ | where in the formula, NA represents null, and $\lfloor g \rfloor$ represents rounding down to the nearest integer.

In another possible implementation of the eighth aspect, the apparatus is a base station or a chip inside a base station.

According to a ninth aspect, an apparatus is provided. The apparatus includes a receiving unit, configured to receive a demodulation reference signal DMRS sequence that is sent by a base station by using a resource block (RB) of a broadcast signal, and a processing unit, configured to determine a location of the DMRS sequence in a resource element RE included in the RB of the broadcast signal, according to a formula (2), where the processing unit is further configured to obtain the DMRS sequence from the RB of the broadcast signal based on the location of the DMRS sequence.

$$a_{k,l} = r_{l,n}(m) \quad (2),$$ where in the formula, $a_{k,l}$ represents a location of an RE that is in the RB and that is occupied by a sequence code included in the DMRS sequence, k represents an index value of a frequency in a symbol, l represents an index value of a symbol in one slot or an index value of a symbol in the RB of the broadcast signal, n represents an index value of a resource scheduling unit of the broadcast signal, and m represents a sequence index value of the DMRS sequence.

In a possible implementation of the ninth aspect, the broadcast signal is paging information or system information.

In a possible implementation of the ninth aspect, the DMRS sequence is obtained by the base station according to a formula (1), where in the formula, $r_l(m)$ represents the DMRS sequence, c(m) represents a pseudo-random sequence, $n_{RE}$ represents a quantity of resource elements REs occupied by the DMRS sequence, $N_{RB}$ represents a quantity of resource blocks RBs of the broadcast signal, $n_{RE}$ is greater than or equal to 1, and l represents an index value of a symbol in one slot.

$$r_l(m) = \frac{1}{\sqrt{2}}(1 - 2 \cdot c(2m)) + j\frac{1}{\sqrt{2}}(1 - 2 \cdot c(2m+1)), \quad (1)$$

$$m = 0, 1, \ldots, n_{RE}N_{RB} - 1.$$

In a possible implementation of the ninth aspect, a value of k, a value of l, and a value of m are specifically obtained according to a formula (2-1a).

$$k = n_{density}m + v_{shift} + v$$

$$l = \{l_1\} \text{ or} \{l_1, l_2\}$$

$$m = 0, 1, \ldots, N_{RE}N_{RB} - 1$$

$$v_{shift} = N_{ID}^{cell} \bmod n_{density} \quad (2\text{-}1a), \text{ where}$$

in the formula, $n_{density}$ represents density for transmitting the DMRS sequence in the RB, $v_{shift}$ represents a value of a first frequency offset of a start RE location of the DMRS sequence relative to an RE having a lowest frequency, v represents a value of a second frequency offset of the start RE location of the DMRS sequence relative to the RE having a lowest frequency, a value range of $l_1$, and a value range of $l_2$ are 0, 1, 2, . . . , and $N_{symbol}$, and $N_{symbol}$ represents a quantity of symbols in one slot or a quantity of symbols in an RB of the paging information or the system information, $N_{ID}^{cell}$ represents a physical cell identifier of a cell, and mod represents a modulo operation.

According to another aspect of this application, an information indication method is provided. The method includes generating, by a base station, at least one sequence, where the at least one sequence is a DMRS sequence of a PBCH, each of the at least one sequence corresponds to one piece of specified information, and the specified information is any one piece of the following information a valid value tag, information about a downlink control channel scheduling information set(CORESET), frequency resource information of a PDSCH, an FDD identifier/a TDD identifier, an extended cell identifier, an area identity, TRS configuration information, and a synchronization signal block index, and sending, by the base station, a target sequence to a terminal device, where the target sequence is a sequence in the at least one sequence, and the target sequence is used to indicate, to the terminal device, specified information corresponding to the target sequence.

According to another aspect of this application, an information indication method is provided. The method includes receiving, by a terminal device, a target sequence sent by a base station, where the target sequence is a sequence in at least one sequence, the at least one sequence is a DMRS sequence of a PBCH, each of the at least one sequence corresponds to one piece of specified information, and the specified information is any one piece of the following information a valid value tag, information about a downlink control channel scheduling information set(CORESET), frequency resource information of a PDSCH, an FDD identifier/a TDD identifier, an extended cell identifier, an area identity, TRS configuration information, and a synchronization signal block index, and determining, by the terminal device based on the target sequence, specified information corresponding to the target sequence.

According to another aspect of this application, a base station is provided. The base station includes a processing unit, configured to generate at least one sequence, where the at least one sequence is a DMRS sequence of a PBCH, each of the at least one sequence corresponds to one piece of specified information, and the specified information is any one piece of the following information a valid value tag, information about a downlink control channel scheduling information set(CORESET), frequency resource information of a PDSCH, an FDD identifier/a TDD identifier, an extended cell identifier, an area identity, TRS configuration information, and a synchronization signal block index, and a sending unit, configured to send a target sequence to a terminal device, where the target sequence is a sequence in the at least one sequence, and the target sequence is used to indicate, to the terminal device, specified information corresponding to the target sequence.

According to another aspect of this application, a terminal device is provided. The terminal device includes a receiving unit, configured to receive a target sequence sent by a base station, where the target sequence is a sequence in at least one sequence, the at least one sequence is a DMRS sequence of a PBCH, each of the at least one sequence corresponds to one piece of specified information, and the specified information is any one piece of the following information a valid value tag, information about a downlink control channel scheduling information set(CORESET), frequency resource information of a PDSCH, an FDD identifier/a TDD identifier, an extended cell identifier, an area identity, TRS configuration information, and a synchronization signal block index, and a processing unit, configured to determine, based on the target sequence, specified information corresponding to the target sequence.

In the foregoing technical solutions, the base station may indicate any one piece of the following information to the terminal device by using different DMRS sequences of the PBCH, or different PSS sequences or SSS sequences whether the base station allows the terminal device to camp, whether the base station reads a value of RMSI, a part of an SFN or an H-SFN, an identifier of a valid value of a system bandwidth, information about a downlink control channel scheduling information set(CORESET), frequency resource information of a PDSCH, an FDD identifier/a TDD identifier, an extended cell identifier, an area identity, TRS configuration information, and a synchronization signal block index, to reduce signaling interaction between the base station and the terminal device, and reduce detection complexity of the terminal device and overheads. In addition, the base station may alternatively indicate the foregoing information by using different locations of the DMRS sequence of the PBCH or different frequency locations of the PSS sequence or the SSS sequence. This can also reduce signaling interaction between the base station and the terminal device, and reduce detection complexity of the terminal device and overheads.

According to another aspect of this application, an apparatus is provided. The apparatus includes a processor, a memory, a communications interface, and a bus. The memory stores code and data, the processor, the memory, and the communications interface are connected by using the bus, and the processor runs the code in the memory, so that the apparatus performs the demodulation reference signal sequence generation method provided in the first aspect or any possible implementation of the first aspect, or the demodulation reference signal sequence mapping method provided in the third aspect or any possible implementation of the third aspect.

According to another aspect of this application, an apparatus is provided. The apparatus includes a processor, a memory, a communications interface, and a bus. The memory stores code and data, the processor, the memory, and the communications interface are connected by using the bus, and the processor runs the code in the memory, so that the apparatus performs the demodulation reference signal sequence mapping method provided in the second aspect or any possible implementation of the second aspect, or the demodulation reference signal sequence obtaining method provided in the fourth aspect or any possible implementation of the fourth aspect.

According to another aspect of this application, a system is provided. The system includes a base station and a terminal device. The base station is the apparatus provided in the fifth aspect or any possible implementation of the fifth aspect, or is the apparatus provided in the seventh aspect or any possible implementation of the seventh aspect, and/or the terminal device is the apparatus provided in the sixth aspect or any possible implementation of the sixth aspect, or is the apparatus provided in the eighth aspect or any possible implementation of the eighth aspect.

According to another aspect of this application, a computer readable storage medium is provided. The computer readable storage medium stores an instruction, and when the instruction is run on a computer, the computer is enabled to perform the methods provided in the foregoing aspects.

According to another aspect of this application, a computer program product including an instruction is provided. When the computer program product is run on a computer, the computer is enabled to perform the methods provided in the foregoing aspects.

It may be understood that all of the communication method, the apparatus, and the computer storage medium, or the computer program product provided above are used to perform the corresponding method provided above. Therefore, for beneficial effects of the apparatus, the computer storage medium, and the computer program product, refer to the beneficial effects in the corresponding method provided above. Details are not described herein again.

DETAILED DESCRIPTION OF ILLUSTRATIVE EMBODIMENTS

Before this application is described, technical terms involved in embodiments of this application are described first.

A system frame is a radio transmission frame. A time length of the system frame may be 10 milliseconds, and duration of one subframe is 1 ms. In an NR system, a quantity of slots (slot) included in one subframe is related to a subcarrier spacing. Usually, one slot may include seven or 14 consecutive symbols (symbol). Symbol index values are used to identify different symbols. For example, when one slot includes seven consecutive symbols, corresponding symbol index values may be 0 to 6.

A synchronization signal (Synchronization Signal, SS) is a signal used to provide a same time reference. The synchronization signal may include a primary synchronization signal (Primary Synchronization Signal, PSS) and a secondary synchronization signal (Secondary Synchronization Signal, SSS). The primary synchronization signal is used to indicate an ID of a physical cell in a physical cell group, and the secondary synchronization signal indicates a physical cell group number.

For a synchronization signal block (SS block), in the NR, one synchronization signal block may include one PSS OFDM symbol, one SSS OFDM symbol, and two or more PBCH OFDM symbols. An OFDM symbol may be referred to as a symbol, and locations of the PSS symbol, the SSS symbol, and the PBCH symbols in the synchronization signal block have a fixed time-domain distribution relationship and are adjacent. A plurality of synchronization signal blocks form a synchronization signal burst (SS burst), and a plurality of synchronization signal bursts form a synchronization signal burst set (SS burst set).

Figure 1:
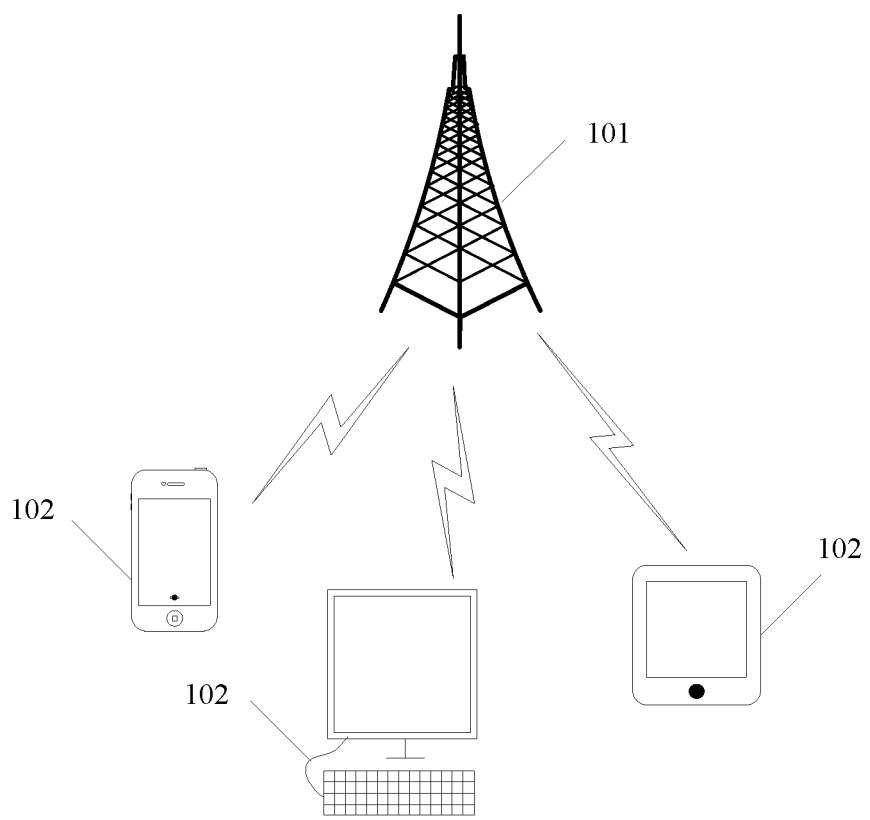
FIG. 1 is a schematic structural diagram of a communications system according to an embodiment of this application.

FIG. 1 is a schematic structural diagram of a communications system to which the embodiments of this application are applied. Referring to FIG. 1, the communications system includes a base station 101 and terminal devices 102.

The base station 101 has a function of scheduling a shared channel, and has a function of establishing scheduling based on a history of packet data sent to the terminal devices 102. Scheduling means that when the plurality of terminal devices 102 share a transmission resource, a mechanism is required to effectively allocate a physical layer resource, to obtain a statistical multiplexing gain.

The terminal devices 102 each have a function of sending and receiving data through a communication channel established between the terminal device 102 and the base station 101. The terminal devices 102 each send or receive a shared channel based on information sent through a scheduling control channel. In addition, the terminal devices 102 may be a mobile station, a mobile terminal, user equipment, a phone, a home appliance, a vehicle, a mobile phone, a tablet computer, a computer, a portable terminal, and the like, and the terminal devices 102 may be of a same type or different types.

The base station 101 and the terminal devices 102 receive and send data through the communication channels. The communication channels may be wireless communication channels. There is at least a shared channel and a scheduling control channel in the wireless communication channels. The shared channel is shared by the plurality of terminal devices 102 to send and receive packets. The scheduling control channel is used to send allocation, a corresponding scheduling result, and the like of the shared channel.

Figure 2:
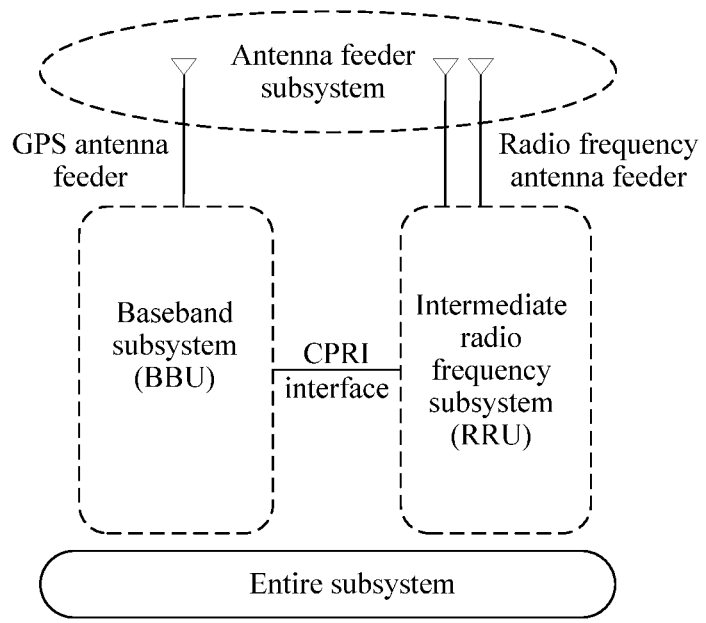
FIG. 2 is a schematic structural diagram of a base station according to an embodiment of this application.

FIG. 2 is a structural diagram of hardware of a base station according to an embodiment of this application. As shown in FIG. 2, the base station includes a baseband subsystem, an intermediate radio frequency subsystem, an antenna feeder subsystem, and some support structures (for example, an entire subsystem). The baseband subsystem is configured to implement operation and maintenance of the entire base station, implement signaling processing, radio resource management, and a transmission interface to a packet core network, and implement a physical layer main control function, a media access control layer main control function, L3 signaling main control function, and a main control function of operation and maintenance. The intermediate radio frequency subsystem implements conversion among a baseband signal, an intermediate frequency signal, and a radio frequency signal, demodulates an LTE wireless received signal, modulates a sent signal, and amplifies a power of the sent signal. The antenna feeder subsystem includes an antenna and a feeder that are connected to a radio frequency module of the base station and an antenna and a feeder that are connected to a GRS receiving card, and is configured to receive and send wireless air interface signals. The entire subsystem supports the baseband subsystem and the intermediate frequency subsystem, and provides a structure, supplies power, and provides an environment monitoring function.

Figure 3:
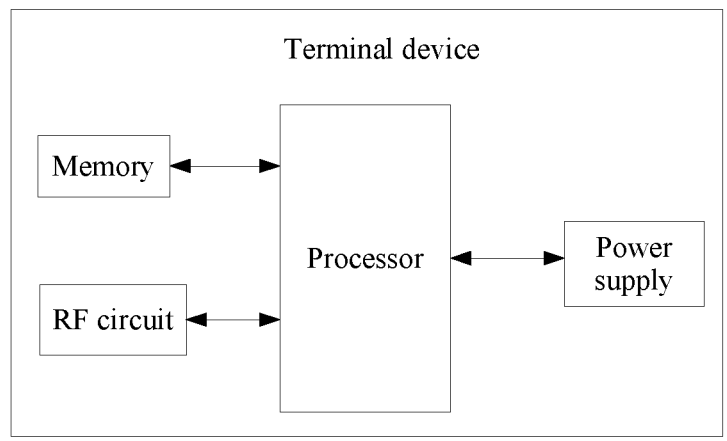
FIG. 3 is a schematic structural diagram of a terminal device according to an embodiment of this application.

FIG. 3 is a schematic structural diagram of a terminal device to which the embodiments of this application are applied. The terminal device may be a mobile phone, a tablet computer, a notebook computer, a mobile device, a mobile station (mobile station), a mobile unit (mobile unit), an M2M terminal, a radio unit, a remote unit, a user agent, a mobile client, or the like. As shown in FIG. 3, the terminal device includes components such as a memory, a processor, a radio frequency (Radio Frequency, RF) circuit, and a power supply. A person skilled in the art may understand that the structure shown in FIG. 3 constitutes no limitation on the terminal device, and the terminal device may include more or fewer components than those shown in the figure, or combine some components, or have a different component arrangement.

The components of the terminal device are specifically described below with reference to FIG. 3.

The memory may be configured to store a software program and a module. The processor runs the software program and the module stored in the memory, to execute various functional applications of the terminal device and perform data processing. The memory may mainly include a program storage area and a data storage area. The program storage area may store an operating system, an application program required by at least one function, and the like. The data storage area may store data created based on use of the terminal device, and the like. In addition, the memory may include a high-speed random access memory, and may further include a nonvolatile memory, and the like.

The processor is a control center of the terminal device, connects parts of the entire terminal device by using various interfaces and lines, and runs or executes the software program and/or the module stored in the memory and invokes the data stored in the memory, to perform various functions of the terminal device and process data, and perform overall monitoring on the terminal device. Optionally, the processor may include one or more processing units. Preferably, the processor may integrate an application processor and a modem processor. The application processor mainly processes an operating system, a user interface, an application program, and the like. The modem processor mainly processes wireless communication.

The radio frequency (Radio Frequency, RF) circuit may be configured to receive and send signals in an information receiving and sending process or a calling process. Usually, the RF circuit includes but is not limited to an antenna, at least one amplifier, a transceiver, a coupler, a low noise amplifier, and a duplexer. In addition, the RF circuit may further communicate with a network and another device through wireless communication. The wireless communication may use any communications standard or protocol, including but not limited to a global system for mobile communications, a general packet radio service, code division multiple access, wideband code division multiple access, long term evolution, email, and short message service.

The terminal device may further include a power supply that supplies power to the parts. Preferably, the power supply may be logically connected to the processor by using a power management system, to implement functions such as charging management, discharging management, and power consumption management by using the power management system.

Although not shown, the terminal device may further include an input unit, a display unit, a sensor module, an audio module, a Wi-Fi module, a Bluetooth module, and the like. Details are not described herein.

Figure 4:
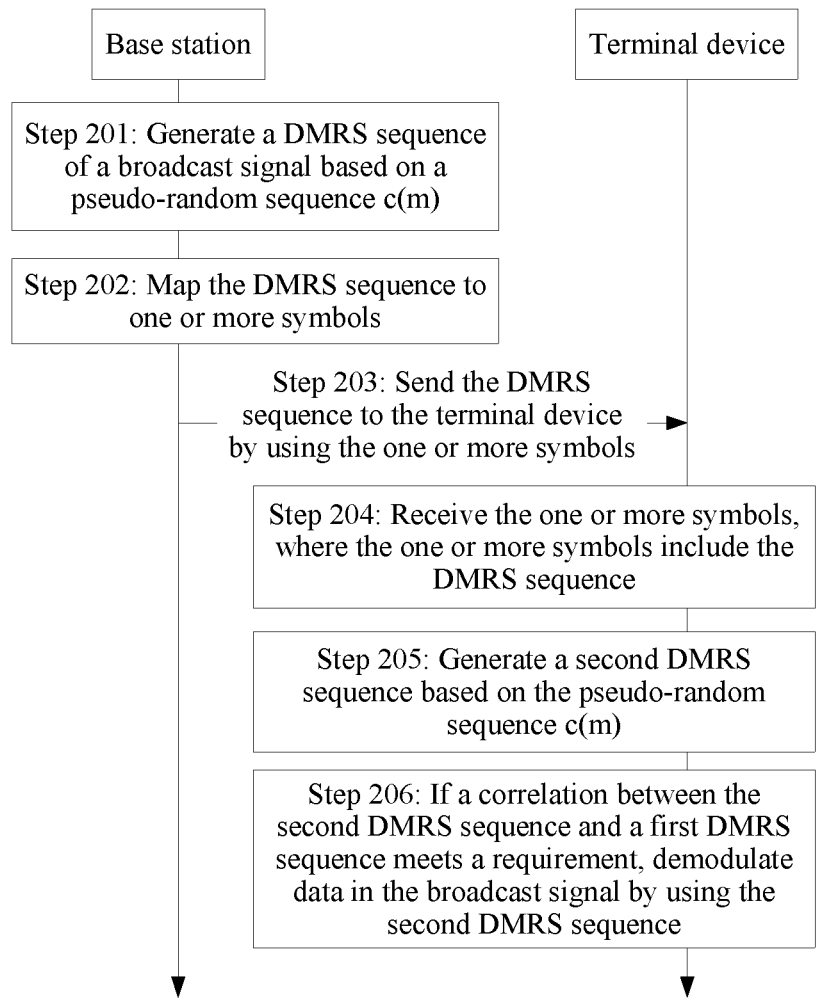
FIG. 4 is a flowchart of a demodulation reference signal sequence generation method according to an embodiment of this application.

FIG. 4 is a flowchart of a demodulation reference signal sequence generation method according to an embodiment of this application. Referring to FIG. 4, the method includes the following several steps.

Step 201: Generate a demodulation reference signal DMRS sequence of a broadcast signal based on a pseudo-random sequence c(m).

The DMRS sequence is related to a quantity $N_{RB}$ of resource blocks RBs of the broadcast signal and a quantity $n_{RE}$ of resource elements REs occupied by the DMRS sequence in one RB. The pseudo-random sequence c(m) may be a golden sequence, a ZC sequence, an m sequence, or the like, and the pseudo-random sequence c(m) may be used to generate the DMRS sequence.

The broadcast signal may be paging information, a physical broadcast channel (PBCH), or system information. The DMRS sequence may be used for a physical downlink control channel and a physical downlink shared channel of the broadcast signal. The broadcast signal may have a common antenna port number. In other words, the paging information, the physical broadcast channel and the system information have a common DMRS design.

In addition, a value of the quantity $N_{RB}$ of resource blocks RBs of the broadcast signal is related to a scanning bandwidth of a base station, and a terminal device may determine $N_{RB}$ by using a PDCCH, a PBCH, or RMSI. The quantity $n_{RE}$ of resource elements REs occupied by the DMRS sequence in one RB may be a quantity of REs for transmitting the DMRS sequence in one symbol in one RB, or may be a total quantity of REs for transmitting the DMRS sequence in one RB, namely, a total quantity of REs for transmitting the DMRS sequence in a plurality of symbols occupied by the DMRS sequence in one RB.

Specifically, the DMRS sequence of the broadcast signal may be generated based on the pseudo-random sequence c(m) according to a formula (1). In the formula, m represents an index value of a sequence code of the DMRS sequence, and l represents an index value of a symbol in one slot. For example, when one slot includes seven symbols, a value of l may be an integer from 0 and 6.

$$r_l(m) = \frac{1}{\sqrt{2}}(1 - 2 \cdot c(2m)) + j\frac{1}{\sqrt{2}}(1 - 2 \cdot c(2m+1)), \quad (1)$$

$$m = 0, 1, \ldots, n_{RE}N_{RB} - 1.$$

For example, when the broadcast signal is paging information or system information, a value of the quantity $n_{RE}$ of resource elements REs occupied by the DMRS sequence in one RB may be 3 or 4. In other words, the quantity of REs for transmitting the DMRS sequence in one symbol in one RB may be 3 or 4, or the total quantity of REs for transmitting the DMRS sequence in one RB may be 3 or 4.

Step 202: Map the DMRS sequence to one or more symbols.

It should be noted that steps 201 and 202 may be performed by the base station, or may be performed by a chip in the base station device. In FIG. 4, the base station is used as an example for description.

The one or more symbols may be one or more symbols included in the RB of the broadcast signal. When the base station generates the DMRS sequence, the base station may map the DMRS sequence to the one or more symbols included in the RB of the broadcast signal.

Optionally, the base station maps the DMRS sequence of the broadcast signal to a resource element RE included in the resource block (RB) of the broadcast signal, according to a formula (2):

$$a_{k,l} = r_{l,n}(m) \quad (2), \text{ where}$$

in the formula, $a_{k,l}$ represents a location of an RE that is in the RB of the broadcast signal and that is occupied by the sequence code included in the DMRS sequence, k represents an index value of a frequency in a symbol, l represents an index value of a symbol in one slot or an index value of a symbol in the RB of the broadcast signal, n represents an index value of a resource scheduling unit of the broadcast signal, m represents a sequence index value of the DMRS sequence, and $r_l(m)$ is used to represent the DMRS sequence.

A value of k, a value of l, and a value of m in the formula (2) may be specifically obtained according to a formula (2-1):

$$k = n_{density} m + v_{shift} + v$$

$$l = \{l_1\} \text{ or } \{l_1, l_2\}$$

$$m = 0, 1, \ldots, N_{RE} N_{RB} - 1$$

$$v_{shift} = N_{ID}^{cell} \bmod n_{density} \quad (2\text{-}1a), \text{ where}$$

in the formula, $n_{density}$ represents density for transmitting the DMRS sequence on an RB of paging information or system information, and is specifically a quantity of REs that separate, in terms of frequency, two adjacent REs for transmitting the DMRS sequence, $v_{shift}$ represents a value of a first frequency offset of a start RE location of the DMRS sequence relative to an RE having a lowest frequency, the value of the first frequency offset is expressed in a quantity of REs, and a value of $v_{shift}$ is an integer from 0 to 11, v represents a value of a second frequency offset of the start RE location of the DMRS sequence relative to the RE having a lowest frequency, the value of the second frequency offset is expressed in a quantity of REs, a value of v is an integer from −6 to 6, and $v = v_{shift} - n_{density}$ when $v_{shift} + n_{density}$, a value range of $l_1$ and a value range of $l_2$ are 0, 1, 2, ..., and $N_{symbol}$, $N_{symbol}$ represents a quantity of symbols in one slot or a quantity of symbols in the RB of the paging information or the system information, and a value of $N_{symbol}$ may be an integer from 1 to 14, $N_{ID}^{cell}$ represents a physical cell identifier of a cell, and mod represents a modulo operation.

Optionally, a value of k, a value of l, and a value of m in the formula (2) may be specifically shown in a form of a table. A specific relationship between the value of k and each of density $n_{density}$ for transmitting the DMRS sequence in the RB of the broadcast signal and a sum $v_{shift} + v$ of values of frequency offsets of an RE for transmitting the DMRS sequence relative to an RE having a lowest frequency in the RB of the broadcast signal is shown in the following Table 1:

TABLE 1

| Values of $n_{density}$ and $v_{shift} + v$ | Value of k |
| --- | --- |
| $n_{density} = 2$ and $v_{shift} + v = 0$ | $0, 2, 4, 6, \ldots, 12N_{RB} - 2$ |
| $n_{density} = 2$ and $v_{shift} + v = 1$ | $1, 3, 5, 7, \ldots, 12N_{RB} - 1$ |
| $n_{density} = 3$ and $v_{shift} + v = 0$ | $0, 3, 6, 9, \ldots, 12N_{RB} - 3$ |
| $n_{density} = 3$ and $v_{shift} + v = 1$ | $1, 4, 7, 10, \ldots, 12N_{RB} - 2$ |

TABLE 1-continued

| Values of $n_{density}$ and $v_{shift} + v$ | Value of k |
| --- | --- |
| $n_{density} = 3$ and $v_{shift} + v = 2$ | $2, 5, 8, 11, \ldots, 12N_{RB} - 1$ |
| $n_{density} = 4$ and $v_{shift} + v = 0$ | $0, 4, 8, 12, \ldots, 12N_{RB} - 4$ |
| $n_{density} = 4$ and $v_{shift} + v = 1$ | $1, 5, 9, 13, \ldots, 12N_{RB} - 3$ |
| $n_{density} = 4$ and $v_{shift} + v = 2$ | $2, 6, 10, 14, \ldots, 12N_{RB} - 2$ |
| $n_{density} = 4$ and $v_{shift} + v = 3$ | $3, 7, 11, 15, \ldots, 12N_{RB} - 1$ |
| $n_{density} = 6$ and $v_{shift} + v = 0$ | $0, 6, 12, 18, \ldots, 12N_{RB} - 6$ |
| $n_{density} = 6$ and $v_{shift} + v = 1$ | $1, 7, 13, 19, \ldots, 12N_{RB} - 5$ |
| $n_{density} = 6$ and $v_{shift} + v = 2$ | $2, 8, 14, 20, \ldots, 12N_{RB} - 4$ |
| $n_{density} = 6$ and $v_{shift} + v = 3$ | $3, 9, 15, 21, \ldots, 12N_{RB} - 3$ |
| $n_{density} = 6$ and $v_{shift} + v = 4$ | $4, 10, 16, 22, \ldots, 12N_{RB} - 2$ |
| $n_{density} = 6$ and $v_{shift} + v = 5$ | $5, 11, 17, 23, \ldots, 12N_{RB} - 1$ |
| $n_{density} = 12$ and $v_{shift} + v = 0$ | $0, 12, 24, 36, \ldots, 12N_{RB} - 12$ |
| $n_{density} = 12$ and $v_{shift} + v = 1$ | $1, 13, 25, 37, \ldots, 12N_{RB} - 11$ |
| $n_{density} = 12$ and $v_{shift} + v = 2$ | $2, 14, 26, 38, \ldots, 12N_{RB} - 10$ |
| $n_{density} = 12$ and $v_{shift} + v = 3$ | $3, 15, 27, 39, \ldots, 12N_{RB} - 9$ |
| $n_{density} = 12$ and $v_{shift} + v = 4$ | $4, 16, 28, 40, \ldots, 12N_{RB} - 8$ |
| $n_{density} = 12$ and $v_{shift} + v = 5$ | $5, 17, 29, 41, \ldots, 12N_{RB} - 7$ |
| $n_{density} = 12$ and $v_{shift} + v = 6$ | $6, 18, 30, 42, \ldots, 12N_{RB} - 6$ |
| $n_{density} = 12$ and $v_{shift} + v = 7$ | $7, 19, 31, 43, \ldots, 12N_{RB} - 5$ |
| $n_{density} = 12$ and $v_{shift} + v = 8$ | $8, 20, 32, 44, \ldots, 12N_{RB} - 4$ |
| $n_{density} = 12$ and $v_{shift} + v = 9$ | $9, 21, 33, 45, \ldots, 12N_{RB} - 3$ |
| $n_{density} = 12$ and $v_{shift} + v = 10$ | $10, 22, 34, 46, \ldots, 12N_{RB} - 2$ |
| $n_{density} = 12$ and $v_{shift} + v = 11$ | $11, 23, 35, 47, \ldots, 12N_{RB} - 1$ |

In this embodiment of this application, $v=0$ if a quantity $N_{symbol}^{DMRS}$ of symbols occupied by the DMRS sequence is one, or the DMRS sequence occupies a plurality of symbols and the DMRS sequence occupies a same location in the plurality of symbols. If a quantity $N_{symbol}^{DMRS}$ of symbols occupied by the DMRS sequence is more than one, and the DMRS sequence occupies different locations in the plurality of symbols, in other words, the DMRS sequence has different frequency offset values, a relationship between v in different symbols and $N_{symbol}^{DMRS}$ is shown in the following Table 2.

TABLE 2

| | First symbol | Second symbol | Third symbol | Fourth symbol |
| --- | --- | --- | --- | --- |
| $N_{symbol}^{DMRS} = 1$ | $v = 0$ | NA | NA | NA |
| $N_{symbol}^{DMRS} = 2$ | $v = 0$ | $v = n_{density}/2$ | NA | NA |
| $N_{symbol}^{DMRS} = 3$ | $v = 0$ | $v = \lfloor n_{density}/3 \rfloor$ | $v = \lfloor 2n_{density}/3 \rfloor$ | NA |
| $N_{symbol}^{DMRS} = 4$ | $v = 0$ | $v = \lfloor n_{density}/4 \rfloor$ | $v = \lfloor n_{density}/2 \rfloor$ | $v = \lfloor 3n_{density}/4 \rfloor$ |

It should be noted that NA in Table 2 represents null. For example, when $N_{symbol}^{DMRS}$ is 1, it indicates that the DMRS sequence occupies only one symbol. Therefore, only the first symbol exists, the second symbol to the fourth symbol do not exist, and correspondingly, values of v in the second symbol to the fourth symbol do not exist. In addition, in Table 2, $\lfloor g \rfloor$ represents rounding down to the nearest integer. In table 2, description is provided by using an example in which values of $N_{symbol}^{DMRS}$ are respectively 1, 2, 3, and 4, and the relationship between values of v in different symbols and $N_{symbol}^{DMRS}$ in Table 2 constitutes no limitation on this embodiment of this application.

When $N_{symbol}^{DMRS} = 4$, that is, when a quantity of symbols for transmitting the DMRS sequence is 4, if every two symbols are grouped into one group, frequency offset values of the DMRS sequence in each group are the same, and frequency offset values of the DMRS sequence in different groups are different, corresponding v in the first group of symbols is $v=0$ and corresponding v in the second group of symbols is $v = \lfloor n_{density}/2 \rfloor$.

In another embodiment of this application, if the broadcast signal is a PBCH, the base station may map a demodulation reference signal DMRS sequence of the PBCH to a resource element RE included in a resource block (RB) of the PBCH, according to a formula (3):

$$a_{k,l}=r_l(m) \quad (3),$$ where in the formula, $a_{k,l}$ represents a location of an RE that is in the RB of the PBCH and that is occupied by the sequence code included in the DMRS sequence, k represents an index value of a frequency in a symbol, l represents an index value of a symbol in one slot or an index value of a symbol in the RB of the PBCH, and m represents a sequence index value of the DMRS sequence.

In the formula (3), $r_l(m)$ is used to represent the DMRS sequence, and the DMRS sequence may be obtained according to the formula (1) in the foregoing embodiment. For details, refer to the description of the formula (1) in the foregoing embodiment. Details are not described in this embodiment of this application again.

Specifically, a value of k, a value of l, and a value of m in the formula (3) may be specifically obtained according to a formula (2-2):

$$k = n_{density} m + v_{shift} + v$$

$$l = 0, 1, 2, \ldots, N_{symbol}$$

$$m = 0, 1, \ldots, N_{RB}^{PBCH} - 1$$

$$v_{shift} = N_{ID}^{cell} \bmod n_{density} \quad (2\text{-}2),$$ where in the formula, $n_{density}$ represents density for transmitting the DMRS sequence in the RB of the PBCH, and is specifically a quantity of REs that separate, in terms of frequency, two adjacent REs for transmitting the DMRS sequence, $v_{shift}$ represents a value of a first frequency offset of a start RE location of the DMRS sequence relative to an RE having a lowest frequency, the value of the first frequency offset is expressed in a quantity of REs, $v_{shift}$ may be a fixed value, and a value of $v_{shift}$ is less than that of $n_{density}$, or a value of $v_{shift}$ is related to $N_{ID}^{cell}$, v represents a value of a second frequency offset of the start RE location of the DMRS sequence relative to the RE having a lowest frequency, and the value of the second frequency offset is expressed in a quantity of REs, l represents an index value of a symbol in one slot or an index value of a symbol for transmitting the PBCH in one synchronization signal block (SS block), $N_{ID}^{cell}$ represents a physical cell identifier of a cell, and mod represents a modulo operation.

In this embodiment of this application, v=0 if a quantity $N_{symbol}^{DMRS}$ of symbols occupied by the DMRS sequence is one, or v=0 if a quantity $N_{symbol}^{DMRS}$ of symbols occupied by the DMRS sequence is more than one and the DMRS sequence occupies a same location in the plurality of symbols. For example, if the quantity $N_{symbol}^{DMRS}$ of symbols of the DMRS sequence is two, and the DMRS sequence occupies a same location in the two symbols, v in each of the two symbols is v=0. If the DMRS sequence occupies a plurality of symbols, and the DMRS sequence occupies different locations in the plurality of symbols, in other words, the DMRS sequence has different frequency offset values, a relationship between v in different symbols and $N_{symbol}^{DMRS}$ is shown in the following Table 3.

TABLE 3

|  | First symbol | Second symbol |
| --- | --- | --- |
| $N_{symbol}^{DMRS} = 1$ | v = 0 | NA |
| $N_{symbol}^{DMRS} = 2$ | v = 0 | v = $n_{density}/2$ |

In the foregoing Table 3, description is provided by using an example in which values of $N_{symbol}^{DMRS}$ are respectively 1 and 2, and the relationship between values of v in different symbols N DMRS and $N_{symbol}^{DMRS}$ in Table 3 constitutes no limitation on this embodiment of this application.

Step 203: A base station sends the DMRS sequence to a terminal device by using the one or more symbols.

When the base station maps the DMRS sequence to the one or more symbols by using step 202, the base station may send the DMRS sequence to the terminal device by using the one or more symbols, so that the terminal device receives the DMRS sequence of the broadcast signal.

Step 204: The terminal device receives the one or more symbols from the base station, where the one or more symbols include the DMRS sequence. The DMRS sequence received by the terminal device may be referred to as a first DMRS sequence.

Step 205: The terminal device generates a second DMRS sequence based on the pseudo-random sequence c(m). There is no sequence between step 205 and step 201 to step 204. In FIG. 4, description is provided by using an example in which step 204 is performed after step 203.

A method for generating, by the terminal device, the second DMRS sequence based on the pseudo-random sequence c(m) is consistent with a method for generating the DMRS sequence of the broadcast signal in step 201. For details, refer to the description of step 201. Details are not described in this embodiment of this application again.

Step 206: The terminal device demodulates data in the broadcast signal based on the second DMRS sequence if a correlation between the second DMRS sequence and the first DMRS sequence meets a requirement.

Step 206 is performed after step 204 and step 205. To be specific, after the terminal device receives the first DMRS sequence sent by the base station and generates the second DMRS sequence, the terminal device may determine whether the correlation between the second DMRS sequence and the first DMRS sequence meets the requirement.

That the correlation between the second DMRS sequence and the first DMRS sequence meets the requirement means that when the correlation between the first DMRS sequence and the second DMRS sequence is analyzed, a correlation value of the correlation between the first DMRS sequence and the second DMRS sequence is greater than or equal to a preset correlation threshold. Specifically, if the correlation between the second DMRS sequence and the first DMRS sequence meets the requirement, the terminal device may demodulate the broadcast signal by using the DMRS sequence, so that correct demodulation on the broadcast signal is ensured, and the terminal device quickly accesses the base station. In addition, after the terminal device determines the DMRS sequence, the terminal device may further perform channel estimation or the like by using the DMRS sequence.

In addition, the DMRS sequence that is sent by the base station and that is received by the terminal device is obtained by the terminal device from the one or more symbols sent by the base station. Optionally, the terminal device may determine, according to a method in step 202, a location of the RE occupied by the DMRS sequence. A specific process in which the terminal device obtains the DMRS sequence is similar to a process in which the base station maps the DMRS sequence. For details, refer to the foregoing description. Details are not described in this embodiment of this application again.

Further, an initial value $c_{init}$ of the pseudo-random sequence c(m) is related to an index value $n_{SS}$ of a synchronization signal block. Specifically, because the broadcast signal may be paging information, system information, or a PBCH, in step 201 and step 205, when the DMRS sequence of the broadcast signal is generated based on the pseudo-random sequence c(m), the initial value $c_{init}$ of the pseudo-random sequence c(m) is related to specific information of the broadcast signal, and the initial value $c_{init}$ is used to generate the pseudo-random sequence c(m). Description is separately provided below.

(I) The broadcast signal is paging information or system information.

The initial value $c_{init}$ of the pseudo-random sequence c(m) may be either one of initial values shown in the following formulas (1-1a) and (1-1b), which are specifically as follows:

$$c_{init}=2^{k_1}\cdot(n_{SS}+1)+2^{k_2}\cdot N_{ID}+n_{RNTI} \quad (1\text{-}1a); \text{ and}$$

$$c_{init}=2^{10}(m_2(n_{SS}+1)=l_2+1)\cdot(2\cdot N_{ID}^{cell}+1)+2\cdot N_{ID}+n_{RNTI} \quad (1\text{-}1b), \text{ where}$$

in the formulas (1-1a) and (1-1b), a value of $k_1$ and a value of $k_2$ are constants from 0 to 64, and usually may be 15 or 16, $n_{SS}$ represents an index value of a synchronization signal block in a synchronization signal burst set (SS burst set), $N_{ID}$ represents a physical cell identifier $N_{ID}^{cell}$ of a cell or an identifier $N_{ID}^{SFN}$ of an area including a plurality of cells, $n^{RNTI}$ represents a value of a radio network temporary identifier, $n^{RNTI}$ may specifically represent a paging radio network temporary identifier (Paging Radio Network Temporary Identifier, P-RNTI) when the broadcast signal is the paging information, or $n_{RNTI}$ may specifically represent a system information radio network temporary identifier (System Information Radio Network Temporary Identifier, SI-RNTI) when the broadcast signal is the system information, $m_2$ represents a quantity of symbols in an RB of the paging information or the system information, and $l_2$ represents an index value of a symbol in the RB of the paging information or the system information. Optionally, $n_{RNTI}$ may be 0.

In another embodiment of this application, when the broadcast signal is paging information or system information, the initial value $c_{init}$ of the pseudo-random sequence c(m) may be any one of initial values shown in the following formulas (1-1c) to (1-1j), which are specifically as follows:

$$c_{init}=(\lfloor n_s/K \rfloor+1)\cdot(2N_{ID}+1)\cdot 2^{k_1}+n_{RNTI} \quad (1\text{-}1c),$$

$$c_{init}=(\lfloor n_s/K \rfloor+1)\cdot(2N_{ID}+1)\cdot 2^{k_1}+(2N_{ID}^{P\text{-}indication}+1)\cdot 2^N+n_{RNTI} \quad (1\text{-}1d),$$

$$c_{init}=2^{k_1}\cdot(m_1(n_s+1)+l_1+1)\cdot(2\cdot N_{ID}+1)+2\cdot N_{ID} \quad (1\text{-}1e),$$

$$c_{init}=2^{k_1}\cdot(m_1(n_s+1)+l_1+1)\cdot(2\cdot N_{ID}+1)+2\cdot N_{ID}+n_{RNTI} \quad (1\text{-}1f),$$

$$c_{init}=2^{k_1}\cdot(n_{SS}+1)(2\cdot N_{ID}+1)+2\cdot N_{ID} \quad (1\text{-}1g),$$

$$c_{init}=2^{10}\cdot(m_2(n_{SS}+1)+l_2+1)\cdot(2\cdot N_{ID}^{cell}+1)+2\cdot N_{ID} \quad (1\text{-}1h),$$

$$c_{init}=2^{k_1}\cdot(n_{SS}+1)+2^{k_2}\cdot N_{ID} \quad (1\text{-}1i), \text{ and}$$

$$c_{init}=N_{ID} \quad (1\text{-}1j), \text{ where}$$

in the formulas (1-1c) to (1-1j), $\lfloor g \rfloor$ represents rounding down to the nearest integer, K represents a quantity of slots in one subframe, $n_s$ represents an index value of a slot in a radio system frame, $N_{ID}^{P\text{-}indication}$ represents an indication information value of the paging information or the system information, and may carry packet information of the terminal device, m represents a quantity of symbols in one slot, and $l_1$ represents an index value of a symbol in one slot or an index value of a symbol in an RB of the paging information or the system information. In addition, meanings represented by $n_s$, $n_{SS}$, $N_{ID}$, and $n_{RNTI}$, a value range of $k_1$, and a value range of $k_2$ are consistent with those in the formulas (1-1a) and (1-1b). For details, refer to the foregoing description. Details are not described in this embodiment of this application again.

Further, when the broadcast signal is paging information or system information, a DMRS of the paging information or the system information may be a DMRS designed in any one of the following plurality of cases. Details are as follows.

Figure 5:
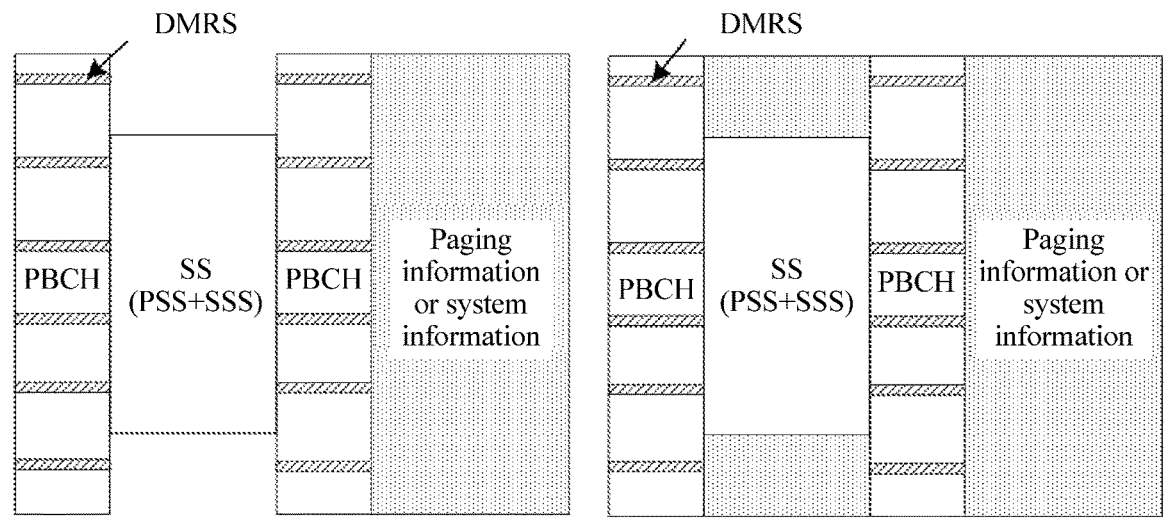
FIG. 5 is a schematic diagram of a distribution of a demodulation reference signal according to an embodiment of this application.

Because multiplexing may be performed on the paging information or the system information and the synchronization signal block (SS block), a DMRS of a PBCH signal in the synchronization signal block may be used as the DMRS of the paging information or the system information, or a common DMRS may be used for the paging information or the system information and the synchronization signal block. In other words, the DMRS of the paging information or the system information and the DMRS of the PBCH have a same antenna port, for example, as shown in FIG. 5. Multiplexing is performed on the paging information or the system information and the PBCH in a time division multiplexing (TDM) manner, and multiplexing may be performed on the paging information or the system information and the synchronization signal block in both a frequency division multiplexing (FDM) manner and a TDM manner. The paging information or the system information may be located on two sides of the PBCH, or may be located on one side or in a middle location of the PBCH. In these several manners, a dedicated DMRS of the PBCH signal may be used as the DMRS of the paging information or the system information. It should be noted that when the dedicated DMRS of the PBCH signal is used as the DMRS of the paging information or the system information, a bandwidth of the PBCH is not significantly different from a bandwidth of the paging information or the system information.

Figure 6:
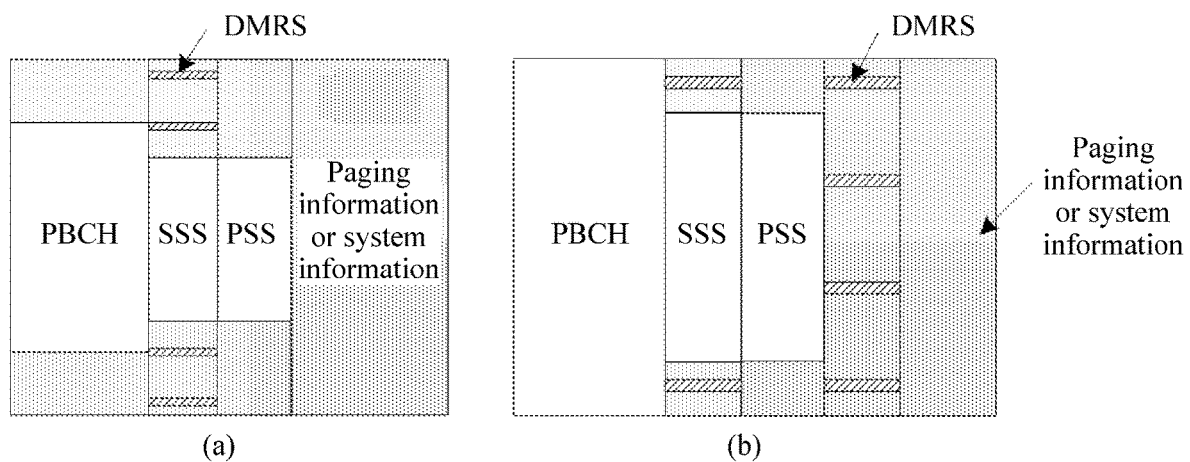
FIG. 6 is a schematic diagram of another distribution of a demodulation reference signal according to an embodiment of this application.

Alternatively, because multiplexing may be performed on the paging information or the system information and the synchronization signal block in a TDM manner or in both an FDM manner and a TDM manner, an SSS in the synchronization signal block and a DMRS carried in the paging information or the system information may be used as the DMRS of the paging information or the system information. In other words, the SSS and the DMRS of the paging information or the system information have a same antenna port number. The SSS may be used for channel estimation, and the dedicated DMRS of the paging information or the system information may be used to assist the SSS in demodulating the paging information or the system information, or may be used to estimate a Doppler frequency shift of a channel. Multiplexing may be performed on the paging information or the system information and the synchronization signal block in the TDM manner, in the FDM manner, or in both the FDM manner and the TDM manner, as shown in FIG. 6. A dedicated DMRS symbol of the paging information or the system information and an SSS symbol may be in a same symbol, as shown in (a) of FIG. 6, or may not be in a same symbol, as shown in (b) of FIG. 6. The paging information or the system information may have a plurality of dedicated DMRS symbols, and all the symbols include the DMRS, or some symbols include the dedicated DMRS. The DMRS may occupy a same location or different locations in different symbols.

Alternatively, because multiplexing may be performed on the paging information or the system information and a synchronization signal block in a TDM manner or in both an FDM manner and a TDM manner, an SSS and a DMRS of a PBCH in the synchronization signal block may be used to demodulate the paging information or the system information, or may be used to assist in demodulating the paging information or the system information. In this case, the SSS, the DMRS of the PBCH, and a DMRS of the paging information or the system information need to have a same antenna port. When multiplexing is performed on the paging information or the system information and the synchronization signal block in the TDM manner, a distribution of the DMRS of the paging information or the system information and a distribution of the DMRS of the PBCH may use a same frequency offset value or different frequency offset values. A dedicated DMRS symbol of the paging information or the system information and an SSS symbol may be in a same symbol, or may be in a PBCH symbol. Each symbol of the paging information or the system information may include the DMRS, or some symbols may include the DMRS. The symbol of the paging information or the system information may be on one side of the synchronization signal block, or may be on two sides of the synchronization signal block.

Alternatively, because multiplexing may be performed on the paging information or the system information and a synchronization signal block in a TDM manner or in both an FDM manner and a TDM manner, a DMRS of a PBCH in the synchronization signal block may be used to demodulate or assist in demodulating the paging information or the system information. In other words, a DMRS of the paging information or the system information and the DMRS of the PBCH have a same antenna port. When multiplexing is performed on the paging information or the system information and the synchronization signal block in the TDM manner, a distribution of the DMRS of the paging information or the system information and a distribution of the DMRS of the PBCH may use a same frequency offset value or different frequency offset values. Each symbol of the paging information or the system information may include the DMRS, or some symbols may include the DMRS. The symbol of the paging information or the system information may be on one side of the synchronization signal block, or may be on two sides of the synchronization signal block. In addition, a DMRS may further be defined, and a port number of the DMRS is specified. The DMRS is used to demodulate both the PBCH and the paging information or the system information, and the DMRS is no longer dedicated to the PBCH, the paging information, or the system information.

Alternatively, the system information includes remaining minimum system information (RMSI) and other system information (OSI). In NR, there are two types of system information: minimum system information including key access system information, and other system information OSI including non-key system information. The minimum system information is divided into two parts: a main information block (MIB) that is transmitted on a PBCH, and remaining minimum system information (RMSI), which is also a broadcast signal. The OSI also includes some broadcast information. Therefore, the OSI and the paging information may be broadcast together, and may use a common DMRS. In other words, the DMRS of the OSI and the DMRS of the paging information have a same antenna port. Multiplexing may be performed on the paging information and the system information in a TDM manner and an FDM manner, but the paging information and the system information share a same DMRS sequence.

Alternatively, multiplexing may be performed on the paging information or the system information and a synchronization signal block in a TDM manner, in an FDM manner, or in both an FDM manner and a TDM manner. Alternatively, the paging information or the system information is independently scanned, and no multiplexing is performed on the paging information or the system information and the synchronization signal block. In these cases, a DMRS of the paging information or the system information may be a dedicated DMRS. Each symbol or some symbols for transmitting the paging information or the system information may include the dedicated DMRS of the paging information or the system information. The dedicated DMRS of the paging information or the system information may have a same frequency offset value in all symbols, or may have different frequency offset values in different symbols.

(II) When the broadcast signal is a PBCH, a DMRS sequence of the PBCH may be an m sequence or a golden sequence. Each PBCH symbol may include same sequences or different sequences, that is, one PBCH symbol includes at least two sequences. DMRS sequences of the PBCH in each synchronization signal block may be the same, that is, same DMRS sequences may be used in all PBCH symbols. Alternatively, DMRS sequences of the PBCH in each synchronization signal block may be different, that is, different DMRS sequences are separately used in two PBCH symbols, or one DMRS sequence is shared by two PBCH symbols. Same DMRS sequences may be used in PBCH symbols in different synchronization signal blocks. In other words, DMRS sequences of all PBCH symbols in different synchronization signal blocks are the same, or in all synchronization signal blocks, same DMRS sequences are used in first PBCH symbols, and same DMRS sequences are used in second PBCH symbols. Alternatively, different DMRS sequences may be used for the PBCH symbols in different synchronization signal blocks, and these DMRS sequences may be related to a PBCH symbol, or may be related to a time index of a synchronization signal block, or may be related to an index value of a slot in a radio system frame, or may be related to an index value of a symbol in a slot, or may be related to an index value of a subframe in a radio system frame, or may be related to an index value of a symbol in a synchronization signal block or an index value of a PBCH symbol in a synchronization signal block.

If the pseudo-random sequence is a golden sequence, the initial value $c_{init}$ of the pseudo-random sequence c(m) may be any one of initial values shown in the following formulas (2-2a) to (2-2f), which are specifically as follows:

$$c_{init}=N_{ID}^{cell} \qquad (2\text{-}2a),$$

$$c_{init}=N_{ID}^{cell}+(N_{half}+1)*2^N \qquad (2\text{-}2b),$$

$$c_{init}=2^{10} \cdot (n_{SS}+1) \cdot (2 \cdot N_{ID}^{cell}+1)+2 \cdot N_{ID}^{cell} \qquad (2\text{-}2c),$$

$$c_{init}=2^K \cdot (n_{SS}+1)+N_{ID}^{cell} \qquad (2\text{-}2d),$$

$$c_{init}=N_{ID}^{cell}+(l+1)*2^K \qquad (2\text{-}2e), \text{ and}$$

$$c_{init}=2^{10} \cdot (7 \cdot (n_s+1)+l+1) \cdot (2 \cdot N_{ID}^{cell}+1)+2 \cdot N_{ID}^{cell} \qquad (2\text{-}2f), \text{ where}$$

in the formulas (2-2a) to (2-2f), $N_{ID}^{cell}$ is a physical cell identifier of a cell, a value of $N_{half}$ is 0 or 1, and when the value is 0, it indicates that the PBCH is located in a first half-frame of a radio system frame, or when the value is 1, it indicates that the PBCH is located in a second half-frame of a radio system frame, a value of K is an integer from 1 to 64, $n_{SS}$ represents an index value of a synchronization signal block in one synchronization signal burst set (SS burst set), and $n_s$ represents an index value of a slot in a radio system frame.

A quantity $N_{RB}$ of resource blocks RBs of the PBCH may be specifically represented as $N_{RB}^{PBCH}$, and $N_{RB}^{PBCH}$ may be obtained based on density $n_{density}$ of DMRS sequences in the RB of the PBCH and a quantity $N_{symbol}$ of symbols occupied by the DMRS sequence in one synchronization signal block (SS block). Usually, the PBCH is distributed in terms of time in a time unit of a symbol and in a frequency unit of 12 subcarriers.

If DMRS sequences in symbols occupied by the PBCH form a long DMRS sequence, that is, one DMRS sequence is mapped to a plurality of symbols, and the DMRS sequences in all the symbols have same density $n_{density}$, for example, $n_{density}$ may be 12, 6, 4, 3, or 2, a value of $N_{RB}^{PBCH}$ may be obtained according to a formula (A), or may be obtained according to the following Table 4:

$$N_{RB}^{PBCH} = (288 * N_{symbol})/n_{density} \quad (A)$$

TABLE 4

| $N_{RB}^{PBCH}$ | $n_{density}$ = 12 | $n_{density}$ = 6 | $n_{density}$ = 4 | $n_{density}$ = 3 | $n_{density}$ = 2 |
|---|---|---|---|---|---|
| $N_{symbol}$ = 1 | 24 | 48 | 72 | 96 | 144 |
| $N_{symbol}$ = 2 | 48 | 96 | 144 | 192 | 288 |
| $N_{symbol}$ = 3 | 72 | 144 | 216 | 288 | 432 |
| $N_{symbol}$ = 4 | 96 | 192 | 288 | 284 | 576 |

DMRS sequences in symbols occupied by the PBCH form a long DMRS sequence, that is, one DMRS sequence is mapped to a plurality of symbols, the DMRS sequences in all the symbols have different density $n_{density}$, density of DMRS sequences mapped to a secondary synchronization signal SSS bandwidth is $n_{density1}$, and density of DMRS sequences mapped to a bandwidth other than the SSS bandwidth is $n_{density2}$. For example, the DMRS sequences mapped to the SSS bandwidth may be relatively sparse, for example, $n_{density1}$ may be 12 or 6, and the DMRS sequences mapped to the bandwidth other than the SSS bandwidth may be relatively dense, for example, $n_{density2}$ may be 4, 3, or 2. Then, specifically, a value of $N_{RB}^{PBCH}$ may be obtained according to a formula (B), or may be obtained according to the following Table 5:

$$N_{RB}^{PBCH} = (144/n_{density1} + 144/n_{density2}) * N_{symbol} \quad (B)$$

TABLE 5

| $N_{RB}^{PBCH}$ | $(1/n_{density1}, 1/n_{density2})$ | | | | | |
|---|---|---|---|---|---|---|
| | (1/12, 1/4) | (1/12, 1/3) | (1/12, 1/2) | (1/6, +12 1/4) | (1/6, 1/3) | (1/6, 1/2) |
| $N_{symbol}$ = 1 | 48 | 60 | 36 | 48 | 72 | 96 |
| $N_{symbol}$ = 2 | 72 | 120 | 72 | 96 | 144 | 192 |
| $N_{symbol}$ = 3 | 108 | 180 | 108 | 144 | 216 | 288 |
| $N_{symbol}$ = 4 | 144 | 240 | 144 | 192 | 288 | 384 |

If a DMRS in each symbol occupied by the PBCH is an independent DMRS sequence, that is, one DMRS sequence is mapped to one symbol, a value of $N_{RB}^{PBCH}$ may be obtained based only on density $n_{density}$ of the DMRS sequence, and is specifically obtained according to the following Table 6. For example, $n_{density}$ may be 12, 6, 4, 3, or 2, and a corresponding value of $N_{RB}^{PBCH}$ may be 24, 48, 72, 96, or 144.

TABLE 6

| | $n_{density}$ | | | | |
|---|---|---|---|---|---|
| | 12 | 6 | 4 | 3 | 2 |
| $N_{RB}^{PBCH}$ | 24 | 48 | 72 | 96 | 144 |

Figure 7:
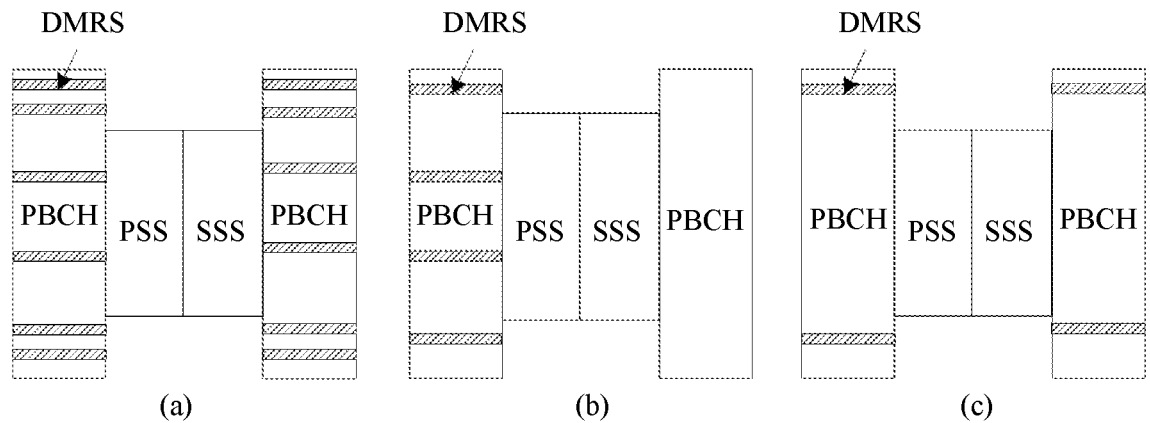
FIG. 7 is a schematic diagram of still another distribution of a demodulation reference signal according to an embodiment of this application.

Further, when the broadcast signal is the PBCH, because multiplexing may be performed on the PBCH and the synchronization signal block in a time division multiplexing TDM manner, an SSS in the synchronization signal block and a dedicated DMRS may be used as a DMRS of the PBCH. However, because a quantity of subcarriers of the PBCH is two times a quantity of subcarriers of the SSS, when a bandwidth of the PBCH falls outside a bandwidth of the SSS, denser DMRSs are needed, or there is no DMRS on a bandwidth the same as the SSS bandwidth, to meet demodulation performance of the PBCH, as shown in (a) of FIG. 7. One PBCH symbol or two PBCH symbols may include the DMRSs, as shown in (b) and (c) of FIG. 7. Alternatively, both PBCH symbols may include the DMRSs, as shown in (a) of FIG. 7. DMRSs in different PBCH symbols may have a same frequency offset value or different frequency offset values, or some resource blocks do not include a DMRS.

According to the demodulation reference signal sequence generation method provided in this embodiment of this application, the base station generates the demodulation reference signal DMRS sequence of the broadcast signal based on the pseudo-random sequence c(m), where the DMRS sequence is related to the quantity $N_{RB}$ of resource blocks RBs of the broadcast signal and the quantity $n_{RE}$ of resource elements REs occupied by the DMRS sequence in one RB, and the base station maps the DMRS sequence to the one or more symbols, and sends the DMRS sequence to the terminal device. The terminal device generates a DMRS sequence according to a same method, and when determining that the correlation between the generated DMRS sequence and the DMRS sequence that is sent by the base station meets the requirement, demodulates the data in the broadcast signal by using the DMRS sequence. Therefore, according to the method, a DMRS sequence corresponding to each broadcast signal can be determined, to ensure that the broadcast signal is correctly demodulated, and improve efficiency of accessing the base station by the terminal device.

Figure 8:
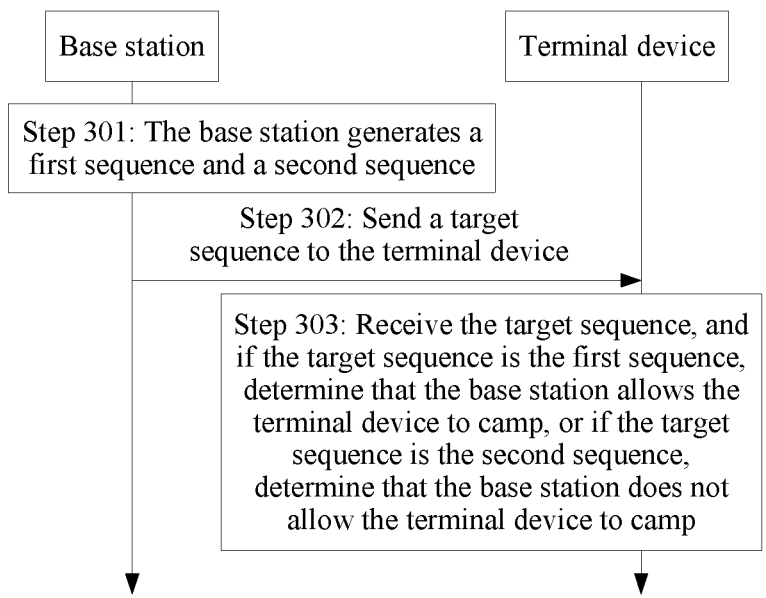
FIG. 8 is a flowchart of a demodulation reference signal sequence indication method according to an embodiment of this application.

FIG. 8 is a flowchart of an information indication method according to an embodiment of this application. Referring to FIG. 8, the method includes the following several steps.

Step 301: A base station generates a first sequence and a second sequence.

The first sequence and the second sequence may be demodulation reference signal DMRS sequences of a PBCH or secondary synchronization signal SSS sequences. The first sequence and the second sequence are two different sequences, and the first sequence and the second sequence both may be DMRS sequences or SSS sequences.

Step 302: The base station sends a target sequence to a terminal device. If the target sequence is the first sequence, the target sequence is used to indicate that the base station allows the terminal device to camp, or if the target sequence is the second sequence, the target sequence is used to indicate that the base station does not allow the terminal device to camp.

Step 303: The terminal device receives the target sequence sent by the base station, and if the target sequence is the first sequence, determines that the base station allows the terminal device to camp, or if the target sequence is the second sequence, determines that the base station does not allow the terminal device to camp.

Specifically, the base station may indicate, by using the DMRS sequence of the PBCH or the SSS sequence, whether the base station allows the terminal device to camp (Information for quick identification that UE can or cannot camp on a cell). For example, the base station separately uses two different DMRS sequences of the PBCH or two different SSS sequences to indicate whether the base station allows the terminal device to camp.

Further, the base station may further indicate, to the terminal device by using different locations of the DMRS sequence of the PBCH or different frequency locations of the SSS sequence, whether the base station allows the terminal device to camp. Details are as follows.

The base station indicates, by using the following information indication method, whether the base station allows the terminal device to camp. The method includes the following steps: The base station generates the first sequence. The base station sends the first sequence to the terminal device, where if a location of the first sequence is a first location, the first sequence is used to indicate that the base station allows the terminal device to camp, or if a location of the first sequence is a second location, the first sequence is used to indicate that the base station does not allow the terminal device to camp, and the first location and the second location are different.

Correspondingly, the terminal device may determine, by using the following information indication method, whether the base station allows the terminal device to camp. The method includes the following steps: The terminal device receives the first sequence sent by the base station. If the location of the first sequence is the first location, the terminal device determines that the base station allows the terminal device to camp, or if the location of the first sequence is the second location, the terminal device determines that the base station does not allow the terminal device to camp, where the first location and the second location are different.

Optionally, the base station and the terminal device may further indicate, based on the foregoing method for indicating whether the base station allows the terminal device to camp, whether the base station reads a value of RMSI. A specific process is similar to the foregoing process of indicating whether the base station allows the terminal device to camp. Details are not described in this embodiment of this application again.

In another embodiment of this application, the DMRS sequence of the PBCH or a PSS sequence/the SSS sequence may be further used to indicate any one piece of the following information: information about some bits of a system frame number (SFN) partial frame number information of a hyper radio system frame (H-SFN), a system bandwidth (Information Regarding Bandwidth Part), a valid value tag, some or all information about a downlink control channel scheduling information set (Control Resource Set, CORESET), whether the base station reads a value of RMSI, frequency resource information of a PDSCH, a subcarrier spacing (Numerology) of RMSI, an FDD identifier/a TDD identifier, an extended cell identifier (cell ID Extension), an area identity (Area ID), tracking reference signal (TRS) configuration information, and a synchronization signal block index. Details are as follows.

(a) The base station uses the DMRS sequence of the PBCH or the PSS sequence/SSS sequence to indicate partial frame number information of an SFN or an H-SFN. The method includes the following steps: The base station generates at least one sequence, where the at least one sequence is any one of the following sequences: a DMRS sequence of a PBCH, a PSS sequence, and an SSS sequence, and each of the at least one sequence corresponds to a part of a radio system frame SFN or a hyper radio system frame H-SFN. The base station sends a target sequence to the terminal device, where the target sequence is a sequence in the at least one sequence, and the target sequence is used to indicate, to the terminal device, a part that is of an SFN or an H-SFN and that corresponds to the target sequence.

Correspondingly, the terminal device receives the target sequence sent by the base station. The target sequence is a sequence in the at least one sequence, the at least one sequence is any one of the following sequences: a DMRS sequence of a PBCH, a PSS sequence, and an SSS sequence, and each of the at least one sequence corresponds to a part of a radio system frame SFN or a hyper radio system frame H-SFN. The terminal device determines, based on the target sequence, the part that is of the SFN or the H-SFN and that corresponds to the target sequence.

Specifically, the base station uses different DMRS sequences of the PBCH or different PSS sequences/SSS sequences to indicate a frame number of the radio system frame. There are two specific indication manners: (1) The DMRS sequences of the PBCH or the PSS sequences/SSS sequences are used to indicate X most significant bits (Most Significant Bit, MSB) of an SFN or an H-SFN. For example, the base station uses four sequences to indicate two most significant bits of the SFN or the H-SFN. A sequence 1 corresponds to 00, a sequence 2 corresponds to 01, a sequence 3 corresponds to 00, and a sequence 4 corresponds to 11. (2) The DMRS sequences of the PBCH or the PSS sequences/SSS sequences are used to indicate X least significant bits (Least Significant Bit, LSB) of the SFN. In addition, alternatively, different DMRS sequences in two symbols may be used, to jointly indicate partial frame number information of an SFN. Alternatively, locations of a DMRS sequence may be used to indicate partial frame number information of an SFN.

(b) The base station uses the DMRS sequence of the PBCH or the PSS sequence/SSS sequence to indicate a system bandwidth. The method includes the following steps: The base station generates at least one sequence, where the at least one sequence is any one of the following sequences: a DMRS sequence of a PBCH, a PSS sequence, and an SSS sequence, and each of the at least one sequence corresponds to one system bandwidth. The base station sends a target sequence to the terminal device, where the target sequence is a sequence in the at least one sequence, and the target sequence is used to indicate, to the terminal device, a system bandwidth corresponding to the target sequence.

Correspondingly, the terminal device receives the target sequence sent by the base station. The target sequence is a sequence in the at least one sequence, the at least one sequence is any one of the following sequences: a DMRS sequence of a PBCH, a PSS sequence, and an SSS sequence, and each of the at least one sequence corresponds to one system bandwidth. The terminal device determines, based on the target sequence, the system bandwidth corresponding to the target sequence.

Specifically, the base station may use N different DMRS sequences of the PBCH or N different PSS sequences/SSS sequences to indicate N different system bandwidths. The N different system bandwidths may be all system bandwidths, or may be some system bandwidths. In addition, alternatively, different sequences may be respectively used as DMRS sequences in two symbols, to jointly indicate all or some system bandwidths.

(c) The base station uses the DMRS sequence of the PBCH to indicate any one piece of the following information: a valid value tag, information about a downlink control channel scheduling information set (CORESET), frequency resource information of a PDSCH, an FDD identifier/a TDD identifier, an extended cell identifier, an area identity, and TRS configuration information. The method includes the following steps: The base station generates at least one sequence, where the at least one sequence is a DMRS sequence of a PBCH, each of the at least one sequence corresponds to one piece of specified information, and the specified information is any one piece of the following information: a valid value tag, information about a downlink control channel scheduling information set (CORESET), frequency resource information of a PDSCH, an FDD identifier/a TDD identifier, an extended cell identifier, an area identity, TRS configuration information, and a synchronization signal block index. The base station sends a target sequence to the terminal device, where the target sequence is a sequence in the at least one sequence, and the target sequence is used to indicate, to the terminal device, specified information corresponding to the target sequence.

Correspondingly, the terminal device receives the target sequence sent by the base station. The target sequence is a sequence in the at least one sequence, the at least one sequence is a DMRS sequence of a PBCH, each of the at least one sequence corresponds to one piece of specified information, and the specified information is any one piece of the following information a valid value tag, information about a downlink control channel scheduling information set (CORESET), frequency resource information of a PDSCH, an FDD identifier/a TDD identifier, an extended cell identifier, an area identity, TRS configuration information, and a synchronization signal block index. The terminal device determines, based on the target sequence, the specified information corresponding to the target sequence.

Specifically, the base station uses the DMRS sequence of the PBCH to indicate a valid value tag. For example, N different DMRS sequences of the PBCH are used to indicate N different valid value tags. Alternatively, different DMRS sequences in two symbols may be used, to jointly indicate N different valid value tags. In addition, alternatively, different locations of the DMRS sequence of the PBCH may be used to indicate N different valid value tags.

The base station uses the DMRS sequence of the PBCH to indicate some or all information about a downlink control channel scheduling information set (CORESET). For example, the base station uses N different DMRS sequences of the PBCH to indicate N different downlink control channel scheduling information sets (CORESET). Alternatively, the base station uses N different DMRS sequences of the PBCH to indicate log 2(N) MSBs of the downlink control channel scheduling information set (CORESET) or log 2(N) LSBs of the downlink control channel scheduling information set (CORESET). Alternatively, different DMRS sequences in two symbols may be used, to jointly indicate N different downlink control channel scheduling information sets (CORESET). Alternatively, different locations of the DMRS sequence of the PBCH may be used to indicate N different downlink control channel scheduling information sets (CORESET).

The base station uses the DMRS sequence of the PBCH to indicate frequency resource information of a PDSCH. For example, N different DMRS sequences of the PBCH are used to indicate N different pieces of frequency resource information of the PDSCH. Alternatively, N different DMRS sequences of the PBCH are used to indicate N MSBs or N LSBs of the frequency resource information of the PDSCH. In addition, alternatively, different DMRS sequences in two symbols may be used, to jointly indicate the frequency resource information of the PDSCH. Alternatively, different locations of the DMRS sequence of the PBCH may be used to indicate N types of frequency resource information of the PDSCH.

The base station uses the DMRS sequence of the PBCH to indicate a subcarrier spacing of RMSI. For example, N different DMRS sequences of the PBCH are used to indicate N different subcarrier spacings of the RMSI. Alternatively, N different DMRS sequences of the PBCH are used to indicate N MSBs or N LSBs of the subcarrier spacing of the RMSI. In addition, alternatively, different DMRS sequences in two symbols may be used, to jointly indicate N different subcarrier spacings of the RMSI. Alternatively, different locations of the DMRS sequence of the PBCH may be used to indicate N different subcarrier spacings of the RMSI.

The base station uses the DMRS sequence of the PBCH to indicate an FDD identifier/a TDD identifier. For example, two different DMRS sequences of the PBCH are used to indicate values of the FDD identifier/the TDD identifier. Alternatively, different locations of the DMRS sequence of the PBCH may be used to indicate values of the FDD identifier/the TDD identifier.

The base station uses the DMRS sequence of the PBCH to indicate an extended cell identifier. For example, N different DMRS sequences of the PBCH are used to indicate N different extended cell identifiers. Alternatively, N different DMRS sequences of the PBCH are used to indicate N MSBs or N LSBs of the extended cell identifier. Alternatively, different DMRS sequences in two symbols may be used, to jointly indicate the extended cell identifier. Alternatively, different locations of the DMRS sequence of the PBCH may be used to indicate some information or all information about the extended cell identifier.

The base station uses the DMRS sequence of the PBCH to indicate an area identity. For example, N different DMRS sequences of the PBCH are used to indicate N different area identities. Alternatively, N different DMRS sequences of the PBCH are used to indicate N MSBs or N LSBs of the area identity. In addition, alternatively, different DMRS sequences in two symbols may be used, to jointly indicate the area identity. Alternatively, different locations of the DMRS sequence of the PBCH may be used to indicate some information or all information about the area identity.

The base station uses the DMRS sequence of the PBCH to indicate TRS configuration information. For example, N different DMRS sequences of the PBCH are used to indicate N different pieces of TRS configuration information. In addition, alternatively, different DMRS sequences in two symbols may be used, to jointly indicate N different pieces of TRS configuration information. Alternatively, different locations of the DMRS sequence of the PBCH may be used to indicate N different pieces of TRS configuration information.

(d) The base station uses the DMRS sequence of the PBCH to indicate a synchronization signal block index (SS block index). Specifically, the base station may perform indication by using the following two different methods. Details are as follows.

Method 1: The base station combines the DMRS sequence of the PBCH and a synchronization signal block index of the PBCH, and independently designs sequences for two symbols for transmitting a DMRS sequence, to jointly indicate a synchronization signal block index value. For example, it is assumed that 64 synchronization signal block index values need to be represented, and the 64 index values may be separately represented. To be specific, there are eight DMRS sequences in a first symbol and eight DMRS sequences in a second symbol, and the sequences in the two symbols may be combined to represent indexes of all synchronization signal blocks in one synchronization signal burst set (SS burst set). Alternatively, the DMRS sequence is used to indicate N MSBs or N LSBs of the synchronization signal block index of the PBCH, and remaining data bits are transmitted in two manners. In a first manner, N3 bits are transmitted implicitly, and the first manner includes one or more of a scrambling-based method, a cyclic redundancy check (CRC) code-based method, a cyclic offset-based method, or a redundancy version (RV)-based method, where N+N3 data bits are all data bits of the synchronization signal block index of the PBCH. In another transmission manner, both explicit transmission and implicit transmission are performed, where N1 bits of content of the PBCH are transmitted explicitly, and then N2 bits are transmitted implicitly, and N+N1+N2 data bits are all data bits of the synchronization signal block index of the PBCH.

All DMRS sequences in the two symbols may be the same or different. Eight DMRS sequences in each symbol may be generated through cyclic shift of one sequence, or may be eight independent sequences. Eight independent sequences represent golden sequences generated based on the eight sequences by using different initialization formulas, or eight pseudo-random sequences that are not initialized, for example, m sequences or ZC sequences. The sequence herein may be a pseudo-random sequence such as a ZC sequence, a golden sequence, or an m sequence, or may be a combination of these sequences, for example, two sequence combinations shown in (a) and (b) of FIG. 9.

Figure 9:
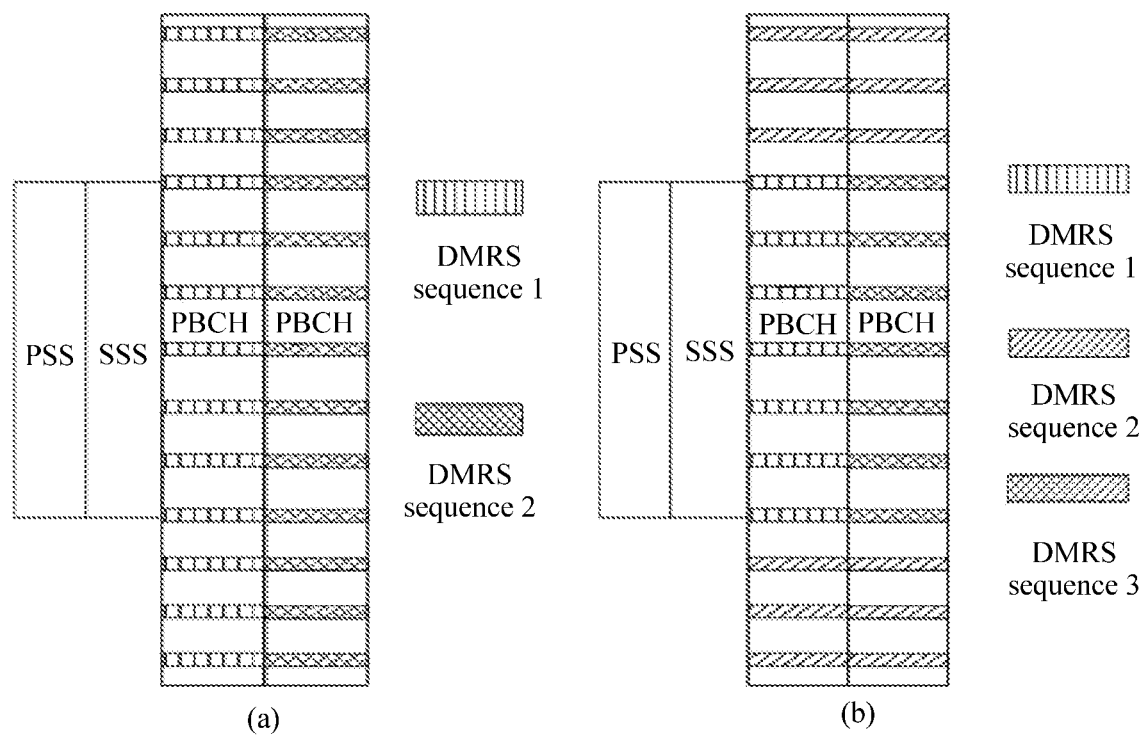
FIG. 9 is a schematic diagram of a combination of DMRS sequences according to an embodiment of this application.

A combination shown in (a) of FIG. 9 indicates that a DMRS sequence in each symbol in a bandwidth of the PBCH is a complete sequence. A combination shown in (b) of FIG. 9 indicates that in each symbol of the PBCH in a bandwidth of the PBCH, one DMRS sequence is used on a bandwidth frequency resource that overlaps that of an SSS, and another DMRS sequence is used on a resource other than an SSS bandwidth, that is, a plurality of DMRS sequences in one synchronization signal block jointly form the DMRS sequence of the PBCH.

Method 2: The base station combines the DMRS sequence of the PBCH and a synchronization signal block index of the PBCH, and designs the DMRS sequence of the PBCH by using two symbols. A DMRS sequence in a first symbol indicates an index value of a synchronization signal burst, a DMRS sequence in a second symbol indicates an index value of a synchronization signal block, and the sequences in the two symbols may be combined to indicate indexes of all synchronization signal blocks in the synchronization signal burst set. Alternatively, a DMRS sequence in a first symbol indicates an index value of a synchronization signal block in a synchronization signal burst, a DMRS sequence in a second symbol indicates an index value of the synchronization signal burst, and the sequences in the two symbols may be combined to indicate indexes of all synchronization signal blocks in the synchronization signal burst set.

The DMRS sequences in the two symbols may be the same or different. Eight DMRS sequences in each symbol may be generated through cyclic shift of one sequence, or may be eight independent sequences. The eight independent sequences represent golden sequences generated based on the eight sequences by using different initialization formulas, or eight pseudo-random sequences that are not initialized, for example, m sequences or ZC sequences. A sequence described herein is a pseudo-random sequence such as a ZC sequence, a golden sequence, or an m sequence. Alternatively, a synchronization signal block index may be represented by using a combination of these sequences, or by using a combination of these sequences together with a frequency domain location of the DMRS.

According to the information indication method provided in this embodiment of this application, the base station may indicate, by using the DMRS sequence of the PBCH or the SSS sequence, any one piece of the following information: whether the base station allows the terminal device to camp, partial frame number information of an SFN, partial frame number information of an H-SFN, a system bandwidth, a valid value tag, some or all information about a downlink control channel scheduling information set, whether the base station reads a value of RMSI, frequency resource information of a PDSCH, a subcarrier spacing of RMSI, an FDD identifier/a TDD identifier, an extended cell identifier, an area identity, TRS configuration information, and a synchronization signal block index, so that signaling interaction between the base station and the terminal device can be reduced, thereby reducing detection complexity of the terminal device and overheads.

The foregoing mainly describes the solutions of the embodiments of this application from a perspective of interaction between network elements. It may be understood that each network element, for example, the base station, the terminal device, a chip in the base station, or a chip in the terminal device, includes a corresponding hardware structure and/or software module for performing each function, to implement the foregoing functions. A person skilled in the art should be easily aware that network elements and algorithm steps in the examples described with reference to the embodiments disclosed in this specification may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional module division may be performed on the base station, the terminal device, the chip in the base station, and the chip in the terminal chip according to the foregoing method examples. For example, each functional module may be obtained through division based on each corresponding function, or two or more functions may be integrated into one processing module. The integrated module may be implemented in a form of hardware, or may be implemented in a form of a software functional module. It should be noted that module division in the embodiments of this application is an example, and is merely logical function division. In actual implementation, another division manner may be used.

Figure 10:
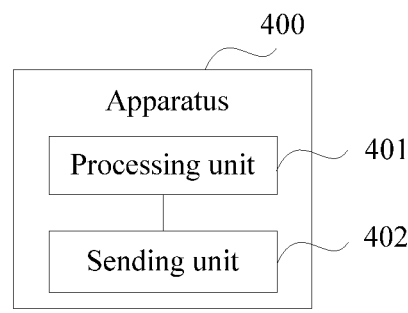
FIG. 10 is a schematic structural diagram of an apparatus according to an embodiment of this application.

When each functional module is obtained through division based on each corresponding function, FIG. 10 is a possible schematic structural diagram of an apparatus 400 in the foregoing embodiment. The apparatus 400 may be a base station, or may be a chip in a base station. The apparatus 400 includes a processing unit 401 and a sending unit 402. The processing unit 401 is configured to perform step 201 and step 202 in FIG. 4 and step 301 in FIG. 8, and/or is configured to perform another process of the technology described in this specification. The sending unit 402 is configured to perform step 203 in FIG. 4 and step 302 in FIG. 8, and/or is configured to perform another process of the technology described in this specification. All related content of each step in the foregoing method embodiments may be cited in function description of a corresponding functional module. Details are not described herein again.

In hardware implementation, the processing unit 401 may be a processor, and the sending unit 402 may be a sending interface. The sending interface and a receiving interface may form a communications interface.

Figure 11:
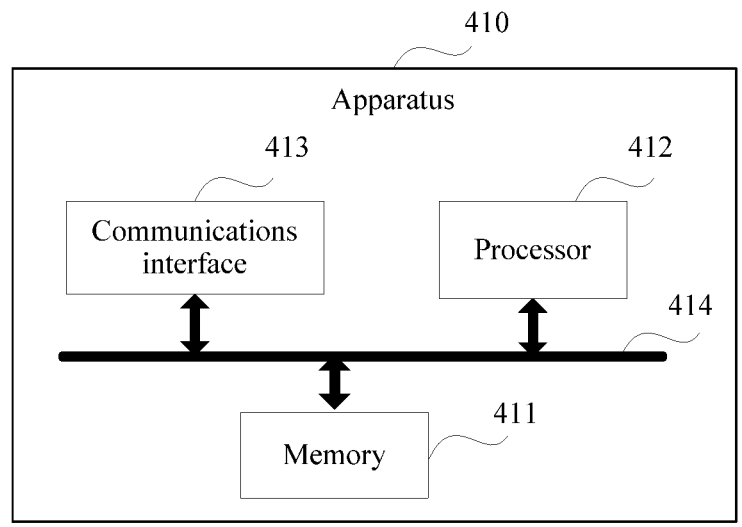
FIG. 11 is a schematic structural diagram of another apparatus according to an embodiment of this application.

FIG. 11 is a possible schematic logical structural diagram of an apparatus 410 in the foregoing embodiment according to an embodiment of this application. The apparatus 410 includes a processor 412, a communications interface 413, a memory 411, and a bus 414. The processor 412, the communications interface 413, and the memory 411 are connected to each other by using the bus 414. In this embodiment of this application, the processor 412 is configured to control and manage an action of the apparatus 410. For example, the processor 412 is configured to perform step 201 and step 202 in FIG. 4 and step 301 in FIG. 8, and/or is configured to perform another process of the technology described in this specification. The communications interface 413 is configured to support the apparatus 410 in communication. The memory 411 is configured to store program code and data of the apparatus 410.

The processor 412 may be a central processing unit CPU, a general-purpose processor, a digital signal processor, an application-specific integrated circuit, a field programmable gate array or another programmable logical device, a transistor logical device, a hardware component, or any combination thereof. The processor 412 may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The bus 414 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 11, but this does not mean that there is only one bus or only one type of bus.

Figure 12:
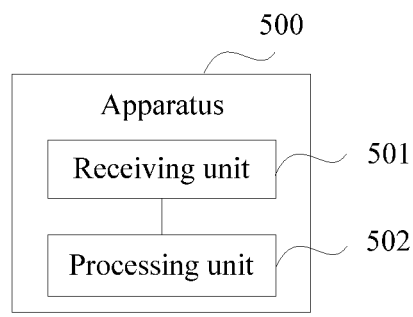
FIG. 12 is a schematic structural diagram of an apparatus according to an embodiment of this application.

When each functional module is obtained through division based on each corresponding function, FIG. 12 is a possible schematic structural diagram of an apparatus 500 in the foregoing embodiment. The apparatus 500 may be a terminal device, or may be a chip in a terminal device. The apparatus 500 includes a receiving unit 501 and a processing unit 502. The receiving unit 501 is configured to perform step 203 in FIG. 4 and a step of receiving a target sequence in step 303 in FIG. 8, and/or is configured to perform another process of the technology described in this specification. The processing unit 502 is configured to perform step 205 and step 206 in FIG. 4 and a process of determining whether a base station allows a terminal device to camp in step 303 in FIG. 8, and/or is configured to perform another process of the technology described in this specification. All related content of each step in the foregoing method embodiments may be cited in function description of a corresponding functional module. Details are not described herein again.

In hardware implementation, the processing unit 502 may be a processor, and the receiving unit 501 may be a receiving interface. The receiving interface and a sending interface may form a communications interface.

Figure 13:
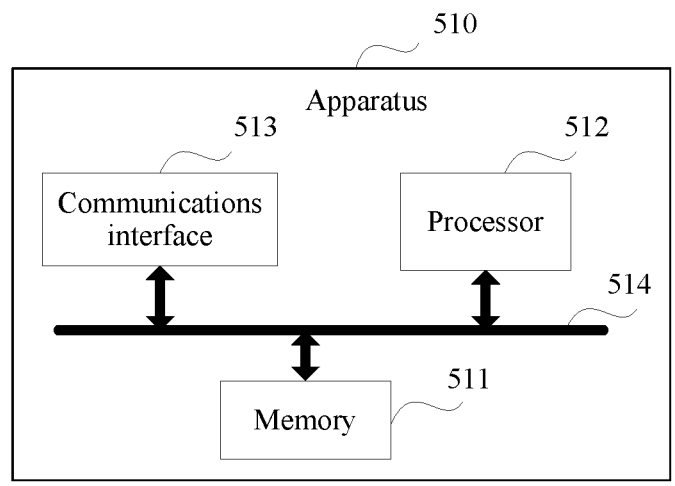
FIG. 13 is a schematic structural diagram of another apparatus according to an embodiment of this application.

FIG. 13 is a possible schematic logical structural diagram of an apparatus 510 in the foregoing embodiment according to an embodiment of this application. The apparatus 510 includes a processor 512, a communications interface 513, a memory 511, and a bus 514. The processor 512, the communications interface 513, and the memory 511 are connected to each other by using the bus 514. In this embodiment of this application, the processor 512 is configured to control and manage an action of the apparatus 510. For example, the processor 512 is configured to perform step 205 and step 206 in FIG. 4 and a process of determining whether a base station allows a terminal device to camp in step 303 in FIG. 8, and/or is configured to perform another process of the technology described in this specification. The communications interface 513 is configured to support the apparatus 510 in communication. The memory 511 is configured to store program code and data of the apparatus 510.

The processor 512 may be a central processing unit CPU, a general-purpose processor, a digital signal processor, an application-specific integrated circuit, a field programmable gate array or another programmable logical device, a transistor logical device, a hardware component, or any combination thereof. The processor 512 may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The bus 514 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 13, but this does not mean that there is only one bus or only one type of bus.

In another embodiment of this application, a computer readable storage medium is further provided. The computer readable storage medium stores an instruction. When the instruction is run on a computer, the computer is enabled to perform steps of a base station or a terminal device in the method provided in FIG. 4 or FIG. 8.

In another embodiment of this application, a computer program product including an instruction is further provided. When the computer program product is run on a computer, the computer is enabled to perform steps of a base station or a terminal device in the method provided in FIG. 4 or FIG. 8.

In another embodiment of this application, a system is further provided. The system includes a base station and a terminal device. The base station may be the base station provided in FIG. 10 or FIG. 11, and is configured to perform steps of a base station in the method provided in FIG. 4 or FIG. 8, and/or the terminal device is the terminal device provided in FIG. 12 or FIG. 13, and is configured to perform steps of a terminal device in the method provided in FIG. 4 or FIG. 8.

In the embodiments of this application, the base station generates the demodulation reference signal sequence of the broadcast signal, and maps the demodulation reference signal sequence, to ensure that there is a dedicated demodulation reference signal sequence of the broadcast signal, so that the broadcast signal is correctly demodulated, and efficiency and accuracy of demodulating the broadcast signal are improved. In addition, according to the information indication method provided in the embodiments of this application, signaling interaction between the base station and the terminal device can be reduced, so that detection complexity of the terminal device and overheads are reduced.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
generating a demodulation reference signal (DMRS) sequence of a broadcast signal according to a pseudo-random sequence c(m), wherein the DMRS sequence is related to a quantity $N_{RB}$ of resource blocks (RBs) of the broadcast signal and a quantity $n_{RE}$ of resource elements (REs) occupied by the DMRS sequence in one RB; and
mapping the DMRS sequence to one or more symbols, the mapping the DMRS sequence to the one or more symbols including mapping the DMRS sequence to an RE included in the RB according to:

$$a_{k,l}=r_{l,n}(m) \qquad (2)$$

wherein $a_{k,l}$ represents a location of an RE that is in the RB and that is occupied by a sequence code in the DMRS sequence, r represents a DMRS sequence, k represents an index value of a frequency in a symbol, l represents an index value of a symbol in one slot or an index value of a symbol in the RB of the broadcast signal, n represents an index value of a resource scheduling unit of the broadcast signal, and m represents a sequence index value of the DMRS sequence; and
wherein k is determined according to:

$$k=n_{density}m+v_{shift}+v$$

wherein $n_{density}$ represents density for transmitting the DMRS sequence in the RB, $V_{shift}$ represents a value of a first frequency offset of a start RE location of the DMRS sequence relative to an RE having a lowest frequency, v represents a value of a second frequency offset of a start RE location of the DMRS sequence relative to an RE having a lowest frequency.

2. The method according to claim 1, wherein the broadcast signal is at least one of paging information, a physical broadcast channel (PBCH), or system information.

3. The method according to claim 2, wherein the broadcast signal occupies a plurality of symbols, and wherein all DMRS sequences in the plurality of symbols have a same frequency offset value in an RB.

4. The method according to claim 2, wherein when the broadcast signal is a PBCH, the DMRS sequence is used to indicate N lowest significant bits (LSBs) in a synchronization signal block index of the PBCH.

5. The method according to claim 2, wherein at least one of a DMRS sequence of the paging information or a DMRS sequence of the system information is multiplexed with a synchronization signal block according to frequency division multiplexing.

6. The method according to claim 1, wherein a value of nRE is 3 or 4.

7. The method according to claim 1, wherein the DMRS sequence is mapped to a plurality of symbols, and wherein a quantity of the plurality of symbols is 3.

8. The method according to claim 1, wherein the pseudo-random sequence c(m) is determined according to an index value of a slot in a radio system frame.

9. The method according to claim 1, wherein the pseudo-random sequence c(m) is determined according to a quantity of symbols in one slot.

10. The method according to claim 1, wherein the DMRS sequence is mapped to a plurality of symbols, and wherein all DMRS sequences in the plurality of symbols have a same density.

11. An apparatus, comprising:
a processor; and
a non-transitory computer-readable storage medium storing a program to be executed by the processor, the program including instructions to:
generate a demodulation reference signal (DMRS) sequence of a broadcast signal according to a pseudo-random sequence c(m); and
map the DMRS sequence to one or more symbols, the mapping the DMRS sequence to the one or more symbols including mapping the DMRS sequence to a resource element (RE) included a resource block (RB) according to:

$$a_{k,l}=r_{l,n}(m) \qquad (2)$$

wherein $a_{k,l}$ represents a location of an RE that is in the RB and that is occupied by a sequence code in the DMRS sequence, r represents a DMRS sequence, k represents an index value of a frequency in a symbol, l represents an index value of a symbol in one slot or an index value of a symbol in the RB of the broadcast signal, n represents an index value of a resource scheduling unit of the broadcast signal, and m represents a sequence index value of the DMRS sequence; and
wherein k is determined according to:

$$k=n_{density}m+v_{shift}+v \qquad (2\text{-}1a)$$

wherein $n_{density}$ represents density for transmitting the DMRS sequence in the RB, $v_{shift}$ represents a value of a first frequency offset of a start RE location of the DMRS sequence relative to an RE having a lowest frequency, v represents a value of a second frequency offset of a start RE location of the DMRS sequence relative to an RE having a lowest frequency.

12. The apparatus according to claim 11, wherein the broadcast signal is at least one of paging information, a physical broadcast channel (PBCH), or system information.

13. The apparatus according to claim 12, wherein the broadcast signal occupies a plurality of symbols, and wherein all DMRS sequences in the plurality of symbols have a same frequency offset value in an RB.

14. The apparatus according to claim 12, wherein when the broadcast signal is a PBCH, and wherein the DMRS sequence indicates N lowest significant bits (LSBs) in a synchronization signal block index of the PBCH.

15. The apparatus according to claim 12, wherein at least one of a DMRS sequence of the paging information or a DMRS sequence of the system information is multiplexed with a synchronization signal block according to frequency division multiplexing.

16. The apparatus according to claim 11, wherein a value of nRE is 3 or 4.

17. The apparatus according to claim 11, wherein the DMRS sequence is mapped to a plurality of symbols, and wherein a quantity of the plurality of symbols is 3.

18. The apparatus according to claim 11, wherein the pseudo-random sequence c(m) is determined according to an index value of a slot in a radio system frame.

19. The apparatus according to claim 11, wherein the pseudo-random sequence c(m) is determined according to a quantity of symbols in one slot.

20. The apparatus according to claim 11, wherein the DMRS sequence is mapped to a plurality of symbols, and wherein all DMRS sequences in the plurality of symbols have a same density.

* * * * *